(12) United States Patent
Satoh

(10) Patent No.: US 6,947,608 B2
(45) Date of Patent: Sep. 20, 2005

(54) EQUALIZING CIRCUIT AND METHOD, AND IMAGE PROCESSING CIRCUIT AND METHOD

(75) Inventor: Hiroki Satoh, Tokyo (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 660 days.

(21) Appl. No.: 10/055,402

(22) Filed: Jan. 25, 2002

(65) Prior Publication Data

US 2003/0142881 A1 Jul. 31, 2003

(51) Int. Cl.$^7$ ................................................ G06K 9/40
(52) U.S. Cl. ........................................ 382/275; 382/260
(58) Field of Search ................................ 382/108, 169, 382/173, 254, 269, 274–275, 289, 305, 260; 333/18, 28 R, 138; 365/194, 196; 375/229

(56) References Cited

U.S. PATENT DOCUMENTS

| | | | | |
|---|---|---|---|---|
| 3,798,576 A | * | 3/1974 | Torpie et al. | ................. 333/18 |
| 5,577,068 A | * | 11/1996 | Bottomley et al. | ......... 375/232 |
| 5,640,469 A | * | 6/1997 | Lewins et al. | ............... 382/274 |
| 5,714,918 A | * | 2/1998 | Menkhoff | ................. 333/28 R |
| 5,835,532 A | * | 11/1998 | Strolle et al. | ............... 375/233 |
| 5,892,852 A | | 4/1999 | Namizuka et al. | |
| 6,163,621 A | * | 12/2000 | Paik et al. | ................. 382/169 |
| 6,222,782 B1 | * | 4/2001 | Chon | ..................... 365/189.09 |
| 6,385,101 B1 | * | 5/2002 | Chang et al. | ............... 365/196 |

FOREIGN PATENT DOCUMENTS

JP 8-18777 1/1996

* cited by examiner

*Primary Examiner*—Kanjibhai Patel
(74) *Attorney, Agent, or Firm*—Foley & Lardner LLP

(57) ABSTRACT

According to an equalizing circuit and an equalizing method, a memory control unit receives an input of an input image data signal, a first memory stores the input image data signal after delaying it and a CPU designates at least any one of a main scan coordinate and a subscan coordinate to start equalizing of the input image data signal, a main scan size and a subscan size of the equalized block and skew values in a main scan direction and in a subscan direction of the equalized block. Then, a register setting unit holds the setting information which is designated by the CPU and an equalizing control unit performs the equalizing of the input image data signal at a certain timing independently of a skew value of the equalized block on the basis of the setting information held by the register setting unit and outputs the equalized image data signal. Thus, a second memory receives an input of the equalized image data signal from the equalizing control unit and holds it as an output image data signal and an output control unit outputs the output image data of the second memory.

17 Claims, 28 Drawing Sheets

Process outside of region (by using left end or right end of image, equalizing is performed)

Normal equalizing

EQUALIZING CIRCUIT AND METHOD, AND IMAGE PROCESSING CIRCUIT AND METHOD

BACKGROUND OF THE INVENTION

The present invention relates to an equalizing circuit for reducing surface roughness of an image and a method thereof, and an image processing circuit and a method by the use of the equalizing circuit and its method.

Conventionally, for example, Jpn. Pat. Appln Publication No. 8-18777 discloses an art with respect to an image processing unit, which improves a resolution of a character part of an image represented by the input image data and improves a gradation of a picture part thereof. That is, according to this art, a character region and a photographic region of an original document are separated and a region signal is output. Then, in accordance with this region signal, gradation processing results for a character and a photograph are selectively switched.

However, in the above described conventional art, it is not suggested to equalize the image signals of the original document in increments of an arbitrary block from an arbitrary position. Further, it is not specifically disclosed to reduce the surface roughness of the image.

BRIEF SUMMARY OF THE INVENTION

The present invention has been made taking the problems into consideration and an object of which is as follows. More specifically, according to the present invention, an input image data signal is equalized in increments of an arbitrary matrix from an arbitrary starting position, in other words, an input image data signal is equalized in increments of a certain equalized block. Then, respective input image data signal in the equalized block is replaced with the equalized image data to be output. Hereby, the surface roughness is reduced.

In order to attain the above described object, an equalizing circuit according to a first aspect of the present invention comprises a memory control unit which receives an input of an input image data signal; a register setting unit which receives setting of a main scan coordinate and a subscan coordinate to start at least the equalizing of the input image data signal; an equalizing control unit which starts the equalizing of the input image data signal from the main scan coordinate and the subscan coordinate, which are set by the register setting unit, and outputs the equalized image data signal; and an output control unit which receives an input of an equalized image data signal from the equalizing control unit and outputs it as an output image data signal.

Alternatively, an image processing circuit according to a second aspect of the present invention comprises a memory control unit which receives an input of an input image data signal; a first memory which stores the input image data signal after delaying it; a CPU which designates at least any one of a main scan coordinate and a subscan coordinate to start equalizing of the input image data signal, a main scan size and a subscan size of the equalized block and skew values in a main scan direction and in a subscan direction of the equalized block; a register setting unit which holds the setting information which is designated by the CPU; an equalizing control unit which performs the equalizing of the input image data signal at a certain timing independently of a skew value of the equalized block on the basis of the setting information held by the register setting unit and outputs the equalized image data signal; a second memory which receives an input of the equalized image data signal from the equalizing control unit and holds it as an output image data signal; and an output control unit which outputs the output image data of the second memory.

Alternatively, an equalizing method according to a third aspect of the present invention comprises receiving an input of an input image data signal from a memory control unit; receiving setting of a main scan coordinate and a subscan coordinate to start at least the equalizing of the input image data signal by a register setting unit; starting the equalizing of the input image data signal from the main scan coordinate and the subscan coordinate, which are set by the register setting unit, and outputting the equalized image data signal by an equalizing control unit; and receiving an input of the equalized image data signal and outputting it as an output image data signal by an output control unit.

Alternatively, an image processing method according to a fourth aspect of the present invention comprises receiving an input of an input image data signal by a memory control unit; storing the input image data signal after delaying it by a first memory; designating at least any one of a main scan coordinate and a subscan coordinate to start equalizing of the input image data signal, a main scan size and a subscan size of the equalized block and skew values in a main scan direction and in a subscan direction of the equalized block by a CPU; holding the setting information which is designated by the CPU at a register setting unit; performing the equalizing of the input image data signal at a certain timing independently of a skew value of the equalized block on the basis of the setting information held by the register setting unit and outputting the equalized image data signal by an equalizing control unit; receiving an input of the equalized image data signal from the equalizing control unit and holding it as an output image data signal by a second memory; and outputting the output image data of the second memory by an output control unit.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a view for illustrating a constitution of a modified example such that a plurality of equalizing circuits to be employed for an embodiment of the present invention are used depending on an application for a photograph and a character or the like;

DETAILED DESCRIPTION OF THE INVENTION

Embodiments according to the present invention will be explained with reference to the drawings below.

At first, with reference to FIG. 1A and FIG. 1B, an outline of the processing according to an equalizing circuit to be employed for an image processing circuit according to an embodiment of the present invention will be explained.

The equalizing circuit according to this embodiment carries out the equalization with respect to an input image data signal by an equalized block defined by a matrix of m×n (m, n is an arbitrary integer number) comprising m pixels (hereinafter, referred to as a main scan size) in a main scan direction and n lines (hereinafter, referred to as a subscan size) in a subscan direction. For example, in FIG. 1A, the equalized block defined by a matrix of 4×3.

Figure 1A:
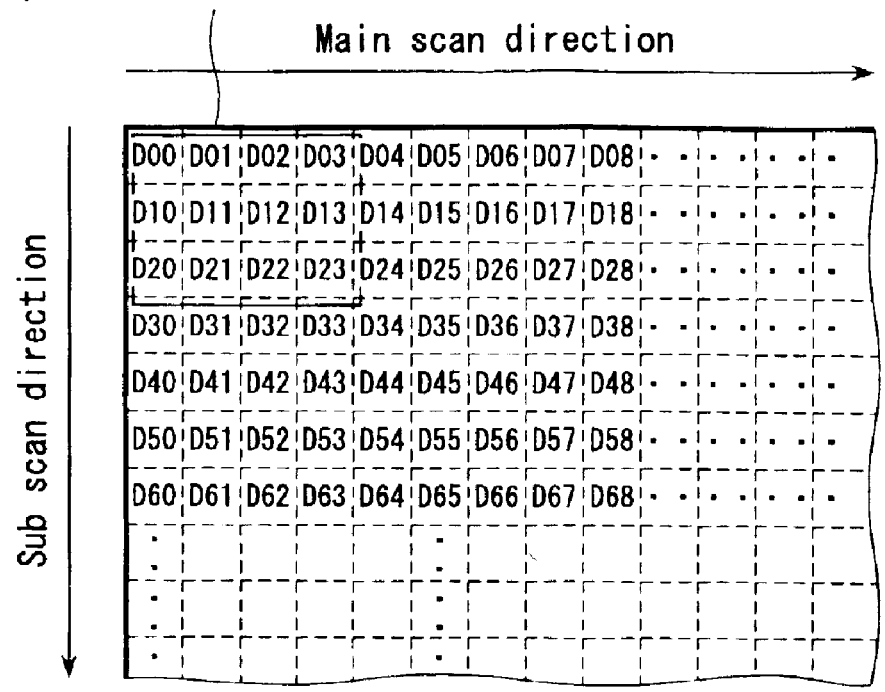
FIGS. 1A and 1B are views for explaining an outline of the processing according to an equalizing circuit to be employed for an image processing circuit according to an embodiment of the present invention.
Figure 1B:
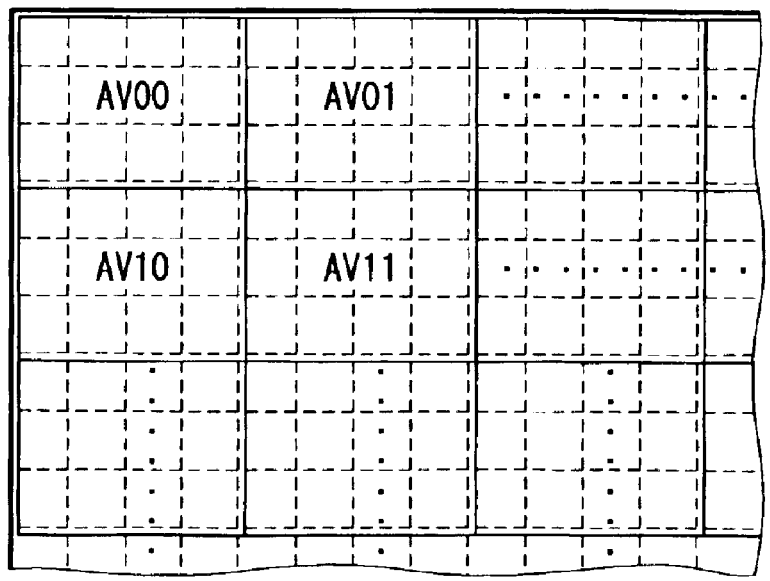

Then, for example, a result of the equalizing processing with respect to the input image data signal shown in FIG. 1A is shown in FIG. 1B. That is, as shown in FIG. 1B, a value of the equalized pixel is defined as a value obtained by dividing sum of the pixels in an equalized block with the number of pixels in the equalized block.

For example, AV00 in FIG. 1B is defined as AV00={(D00+D01+D02+D03)+(D10+D11+D12+D13)+(D20+D21+D22+D23)}/4×3.

In this way, according to the embodiment, the rough surface of the image is reduced by outputting an arbitrary intended pixel as an average value of the peripheral pixels. Further, according to the embodiment, the equalized block according to the equalizing process can be varied to an arbitrary size. Hereby, it is possible to perform the equalizing process depending on the sorts of the input image data signals.

Next, with reference to FIGS. 2A and 2B and FIGS. 3A and 3D, the equalizing process of an equalizing circuit to be employed in an image processing circuit according to an embodiment will be described in detail below.

Figure 2A:
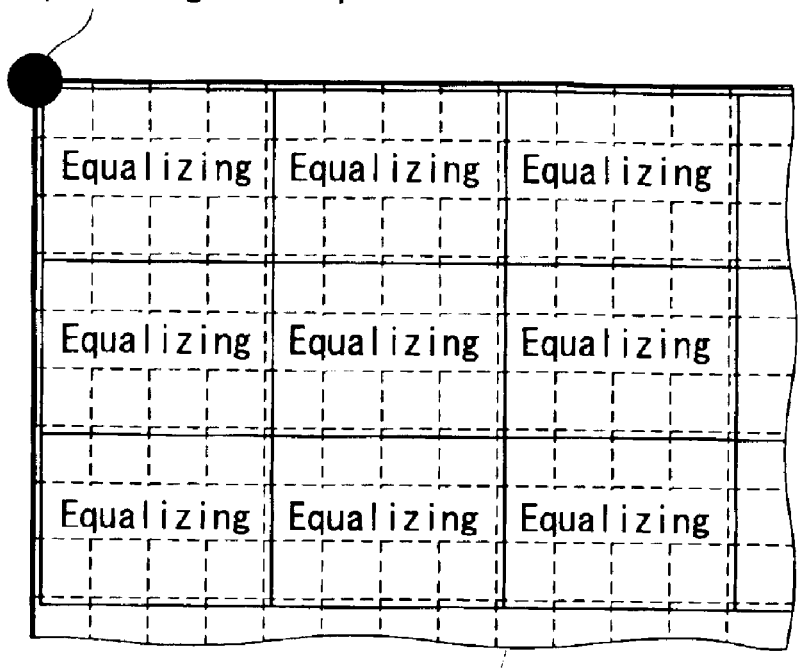
FIG. 2A is a view for illustrating a concept of the processing 1 (without a skew) and FIG. 2B is a view for illustrating a concept of the processing 1 (with a skew)
Figure 2B:
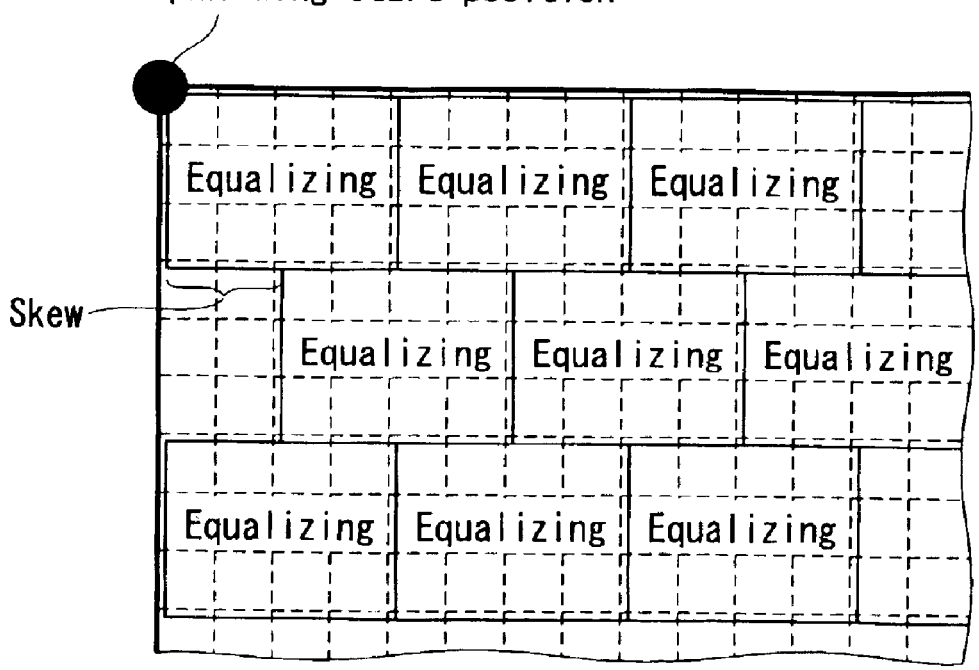

In FIGS. 2A and 2B, a starting position of equalizing process is a left upper end of an input image data, namely, a phase of an equalized block is "0" in both of a main scan direction and a subscan direction.

According to the embodiment, it is assumed that the equalizing process is performed in increments of an equalized block which is defined by a matrix of 4×3 in four pixels in a main scan direction and three lines in a subscan direction.

For more details, FIG. 2A illustrates a case that the equalizing process in a grid shape is performed (there is no skew of the equalized block) and FIG. 2B illustrates a case that the equalizing process in an angled shape is performed (a phase of the equalized block is set).

The above described embodiment gives an example of a normal equalized process.

On the contrary, FIGS. 3A to 3D illustrate examples of the process at a left end, a right end, an upper end and a lower end of an image (hereinafter referred to as a process outside of the region).

Figure 3A:
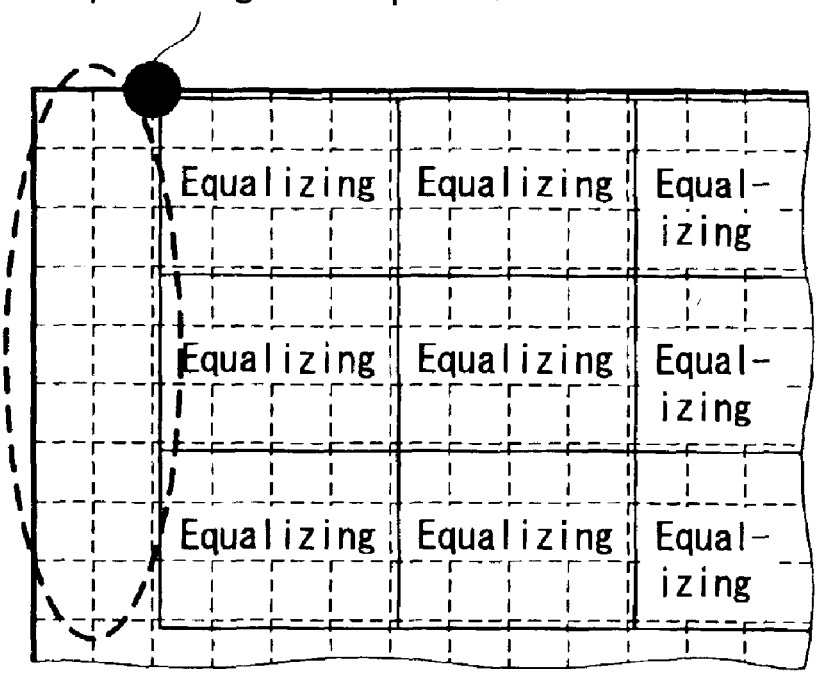
FIG. 3A is a view for illustrating a concept of the processing 2 (a left end in the image)

That is, FIG. 3A illustrates an example such that a phase in a main scan direction is set as "2" and a phase in a subscan direction is set as "0". Additionally, FIG. 3C illustrates an example such that a phase in a main scan direction is set as "0" and a phase in a subscan direction is set as "2". In these cases, a skew of an equalized block is not set.

Figure 3B:
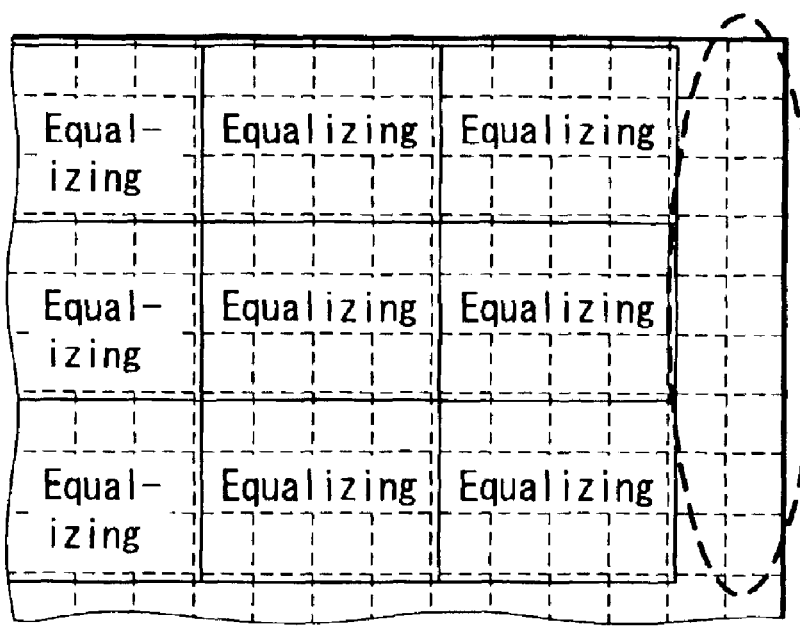
FIG. 3B is a view for illustrating a concept of the processing 3 (a right end in the image)
Figure 3C:
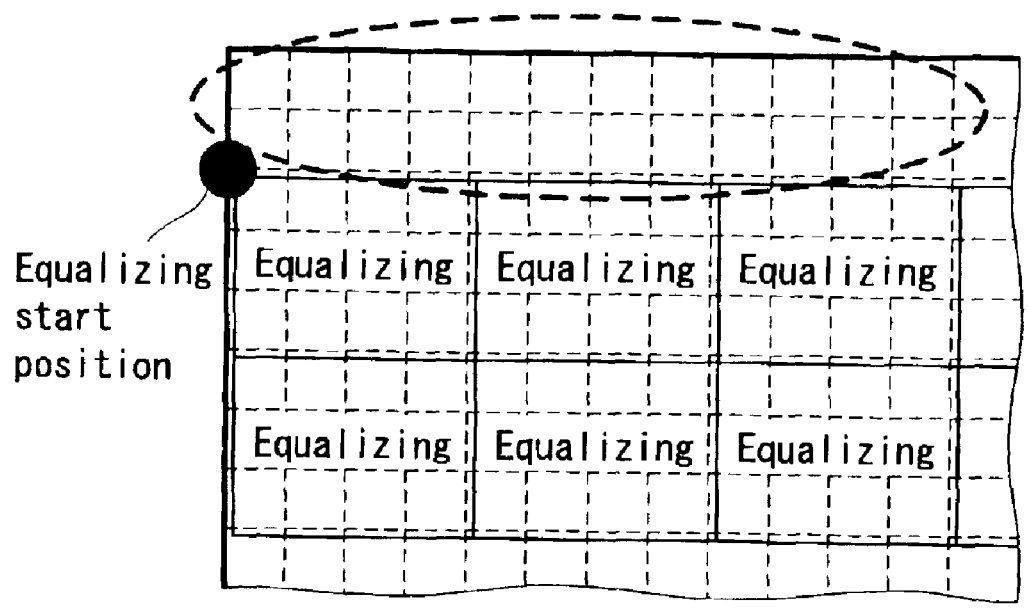
FIG. 3C is a view for illustrating a concept of the processing 4 (an upper end in the image) and FIG. 3D is a view for illustrating a concept of the processing 5 (a lower end in the image)
Figure 3D:
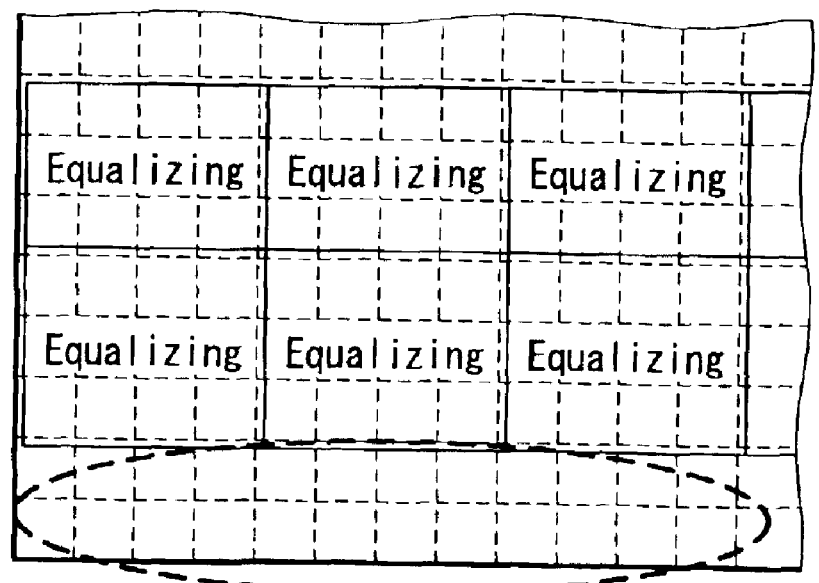

Alternatively, FIGS. 3B and 3D illustrate examples such that a termination position of the equalizing is located at a right end or a lower end of an image. These processes outside of a region is realized, for example, by throughoutputting an original input image data at an upper end and a lower end of the image and, for example, by equalizing the image data by the use of edge pixels at a left end and a right end of the image.

Alternatively, in the following explanation, a normal process shown in FIG. 2A and FIG. 2B is defined as a process 1 and the processes outside of the region shown in FIGS. 3A to 3D are defined as the processes 2 to 5, respectively.

Figure 4:
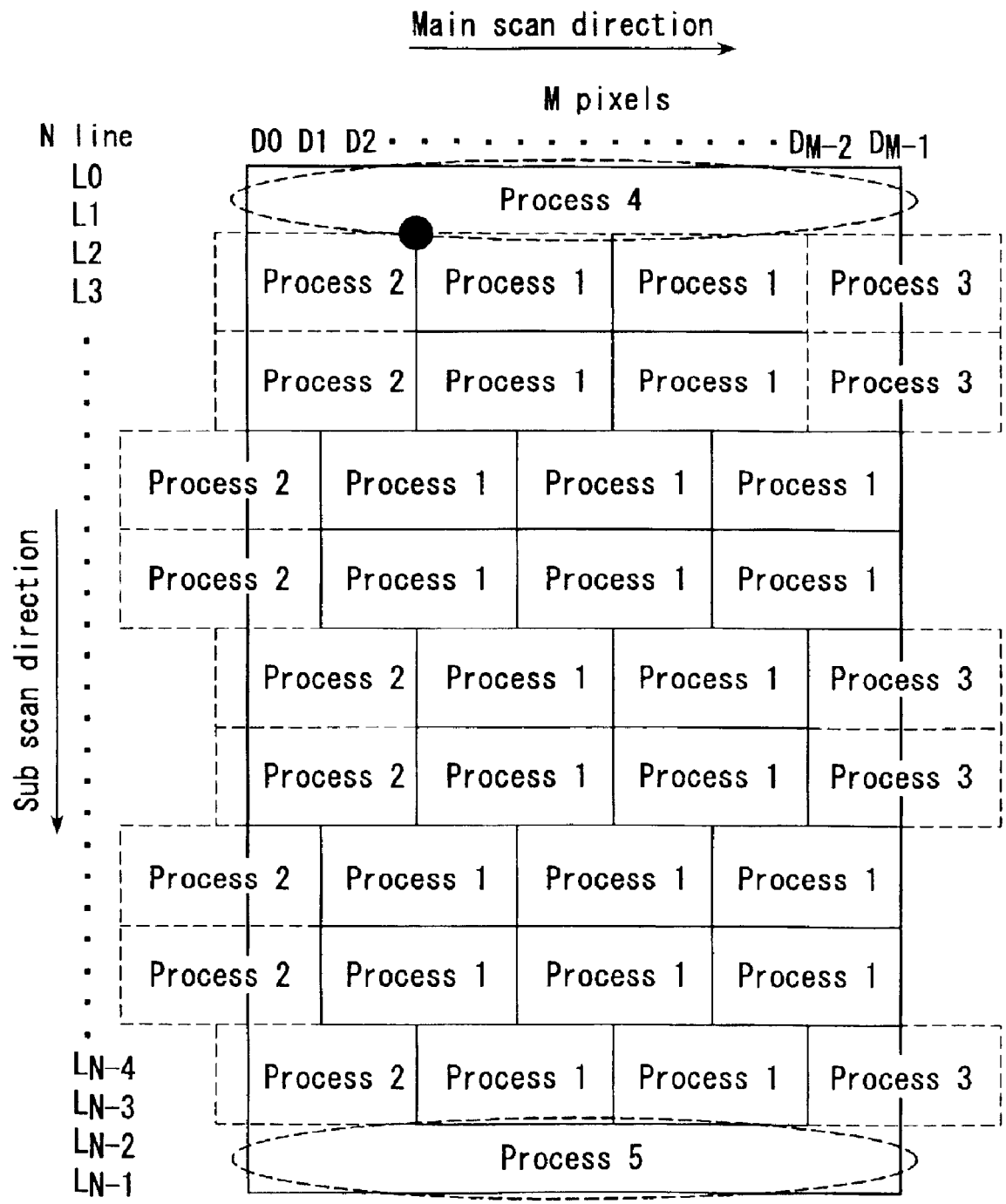
FIG. 4 is a view for illustrating an image of the equalizing processing with respect to the image data having M pixels in a main scan direction and N lines in a subscan direction.

Next, FIG. 4 illustrates an image of the equalizing with respect to the image data having M pixels in a main scan direction and N lines in a subscan direction.

According to this example, a size of an equalized block is defined as 6×3.

In FIG. 4, a process 4, a process 2, a process 3 (it is limited to the case that the process is outside of the region), a process 5 and a normal process 1 are performed, respectively, at the upper end of the image, at the right end of the image, at the left end of the image, at the lower end of the image and within the region.

The details of respective processes 1 to 5 are as already mentioned.

Figure 5:
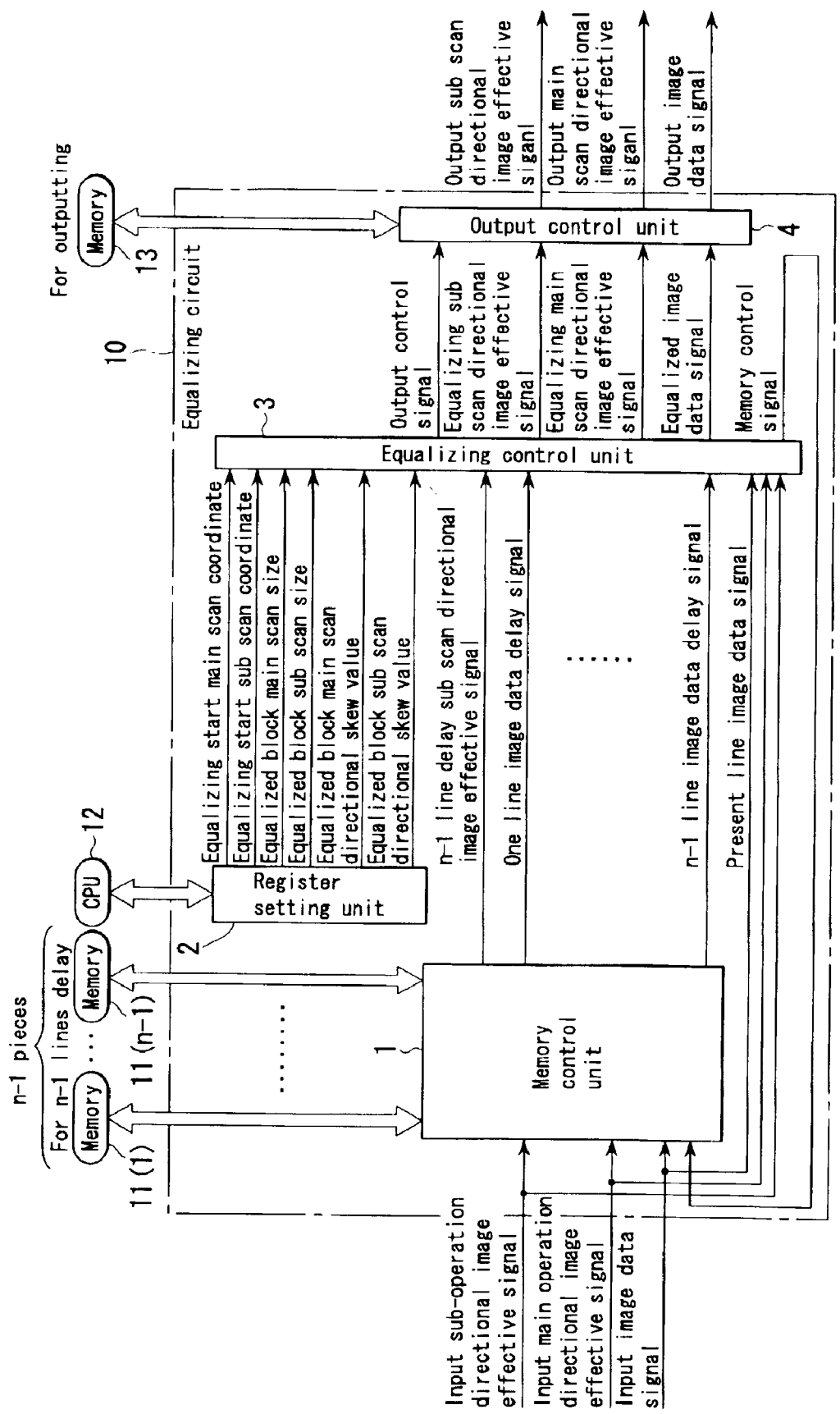
FIG. 5 is a view for illustrating a constitution of an equalizing circuit as an image processing circuit according to an embodiment of the present invention and a constitution of its peripheral circuit.

Next, FIG. 5 illustrates a constitution of an equalizing circuit as an image processing circuit according to an embodiment of the present invention and a constitution of its peripheral circuit.

As shown in FIG. 5, this equalizing circuit 10 comprises a memory control unit 1, a register setting unit 2, an equalizing control unit 3 and an output control unit 4.

This memory control unit 1 is connected to memories 11 (1) ... 11 (n−1) and the equalizing control unit 3 in such a manner that they can be communicating with the memories 11 (1) ... 11 (n−1) and the equalizing control unit 3. In this case, a reference numeral n means a size of an equalized matrix block in a subscan direction.

Further, this memory control unit 1 receives an input image data signal, an input subscan directional image effective signal and an input main scan directional image effective signal from the outside.

Figure 6A:
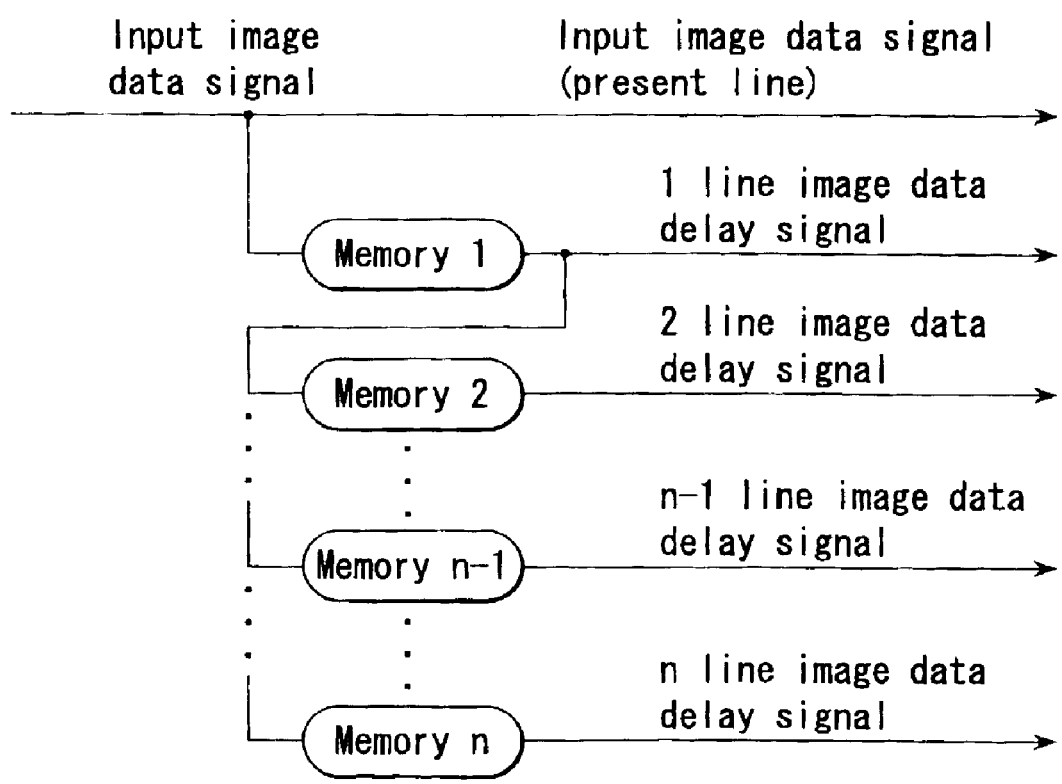
FIG. 6A is a view for illustrating a relation between a line delay memories 11 (1) . . . 11 (n−1) and an input image data signal

Then, as shown in FIG. 6A, this memory control unit 1 accumulates the present input image data signals in the memories 11 (1) to 11 (n−1). Further, on the basis of the input subscan directional image effective signal and the input main scan directional image effective signal, the memory control unit 1 generates the delay image data signals from one line to (n−1) line, which are delayed line by line, and outputs them to the equalizing control unit 3.

Figure 6B:
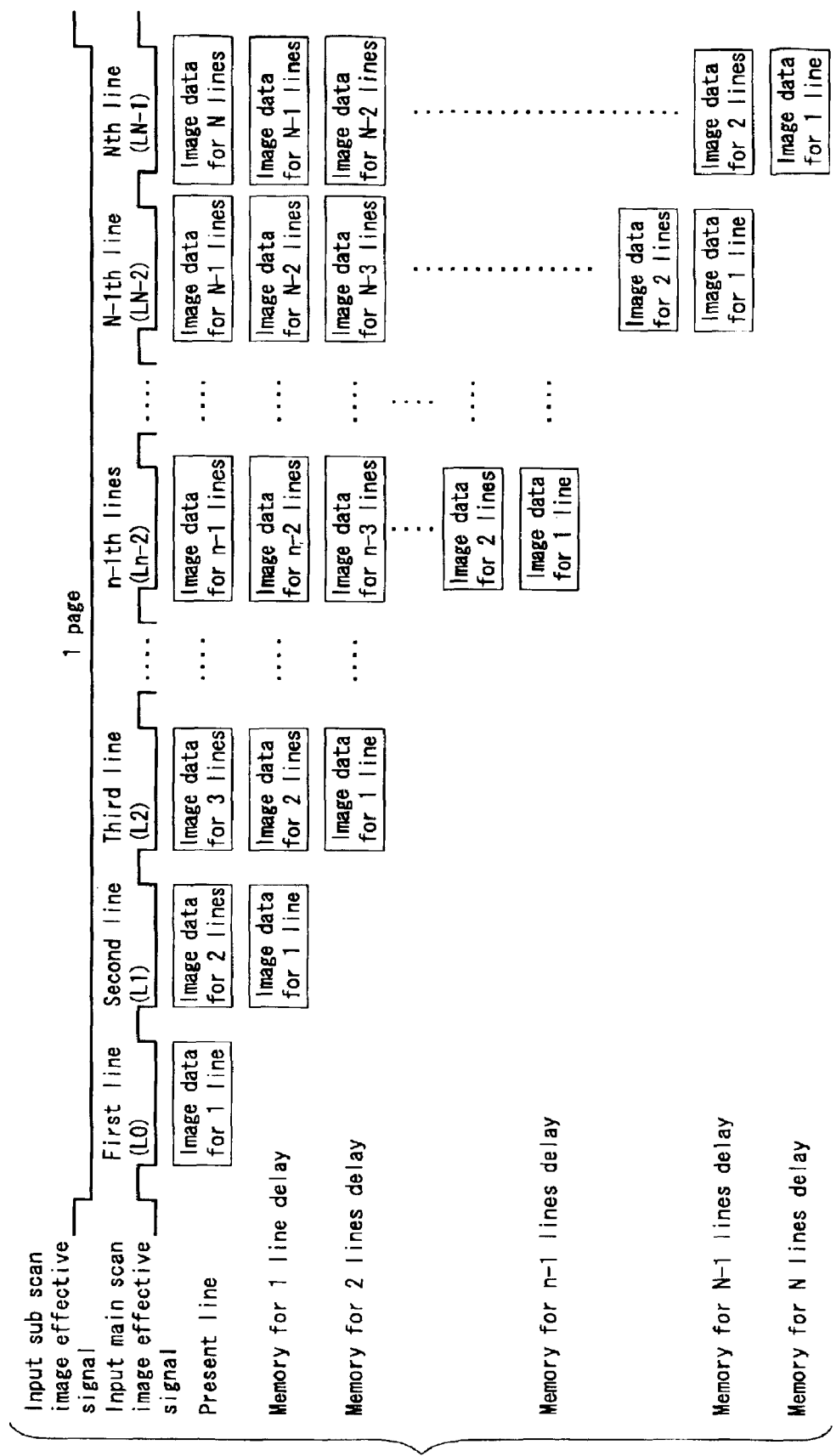
FIG. 6B is a timing chart for illustrating a relation between the line delay memories 11 (1) . . . 11 (n−1) and the input image data signal.

That is, for more details, as shown in FIG. 6B, the memory control unit 1 accumulates the image data, which are delayed clock by clock for every time that the input main scan image effective signal turns from "H" to "L" and it returns to "H", in respective memories 11 (1) to 11 (n−1) in an output term of one page that the input subscan image effective signal turns from "H" to "L" and it returns to "H". Then, the memory control unit 1 reads out the image data delay signals from one line to (n−1) line from the present memories 11 (1) to 11 (n−1) to output them to the equalizing control unit 3.

Figure 7:
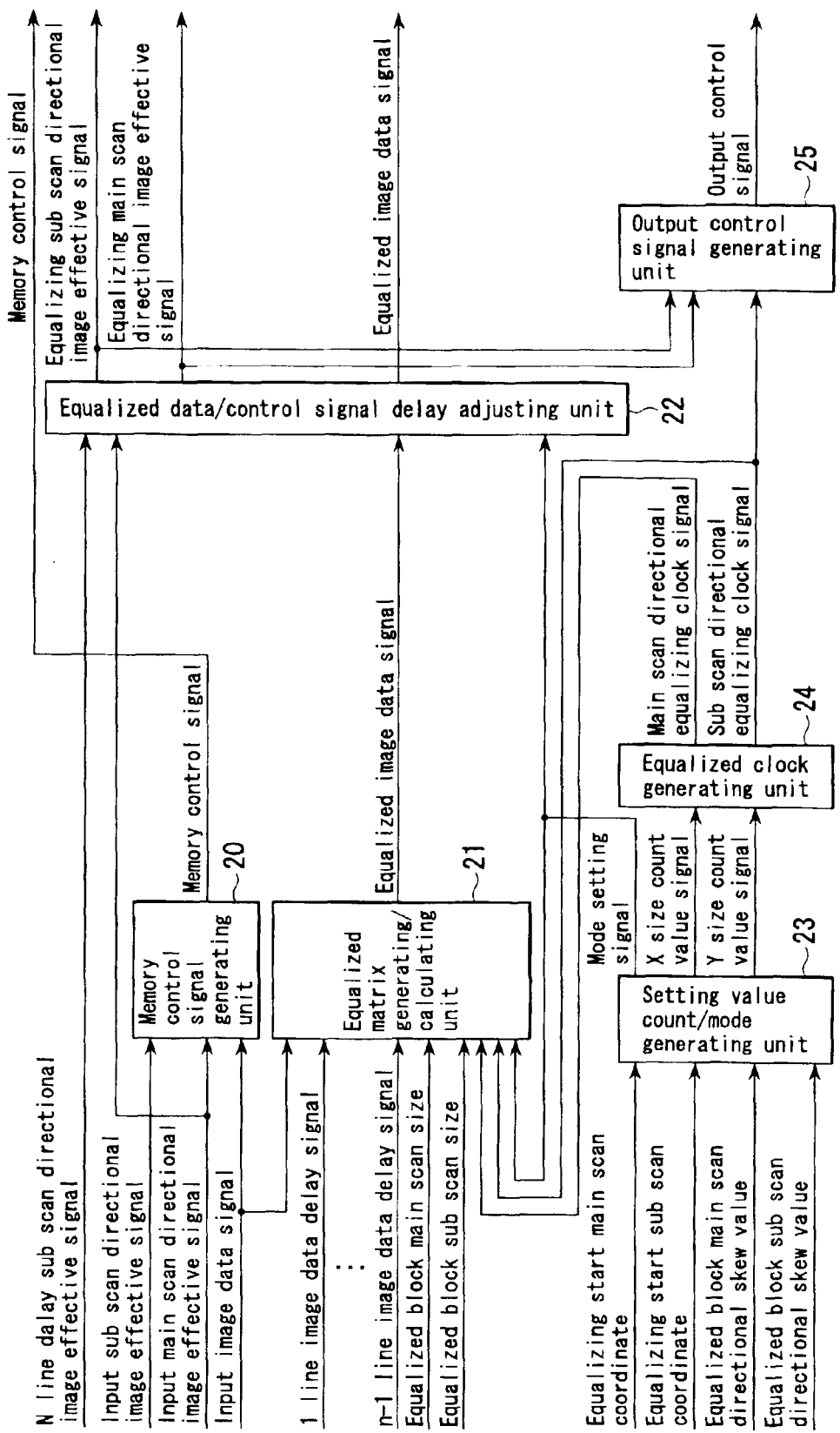
FIG. 7 is a view for illustrating a detailed constitution of an equalizing control unit 3.

In this case, the detailed constitution of the above described equalizing control unit 3 is shown in FIG. 7.

That is, for more details, as shown in FIG. 7, the equalizing control unit 3 has a memory control signal generating unit 20, an equalized matrix block generating/calculating unit 21, an equalized data/control signal delay adjusting unit 22, a setting value count/mode generating unit 23, an equalized clock generating unit 24 and an output control signal generating unit 25.

According to such a constitution, an equalizing start main scan coordinate, an equalizing start subscan coordinate, an equalized block main scan directional skew value, an equalized block subscan directional skew value, which are output from the register setting unit 2 by the control by an outside CPU 12, are transmitted to the setting value count/mode generating unit 23. Then, the setting value count/mode generating unit 23 generates a mode setting signal, an X size count value signal and an Y size count value signal. This mode setting signal is transmitted to the equalizing matrix generating/calculating unit 21 and the equalizing data/control signal delay adjusting unit 22.

Alternatively, the X size count value signal and the Y size count value signal are transmitted to the equalized clock generating unit 24. Then, the equalized clock generating unit 24 generates a main scan directional equalized clock signal and a subscan directional equalized clock signal and these signals are transmitted to the equalizing matrix generating/calculating unit 21.

Figure 8:
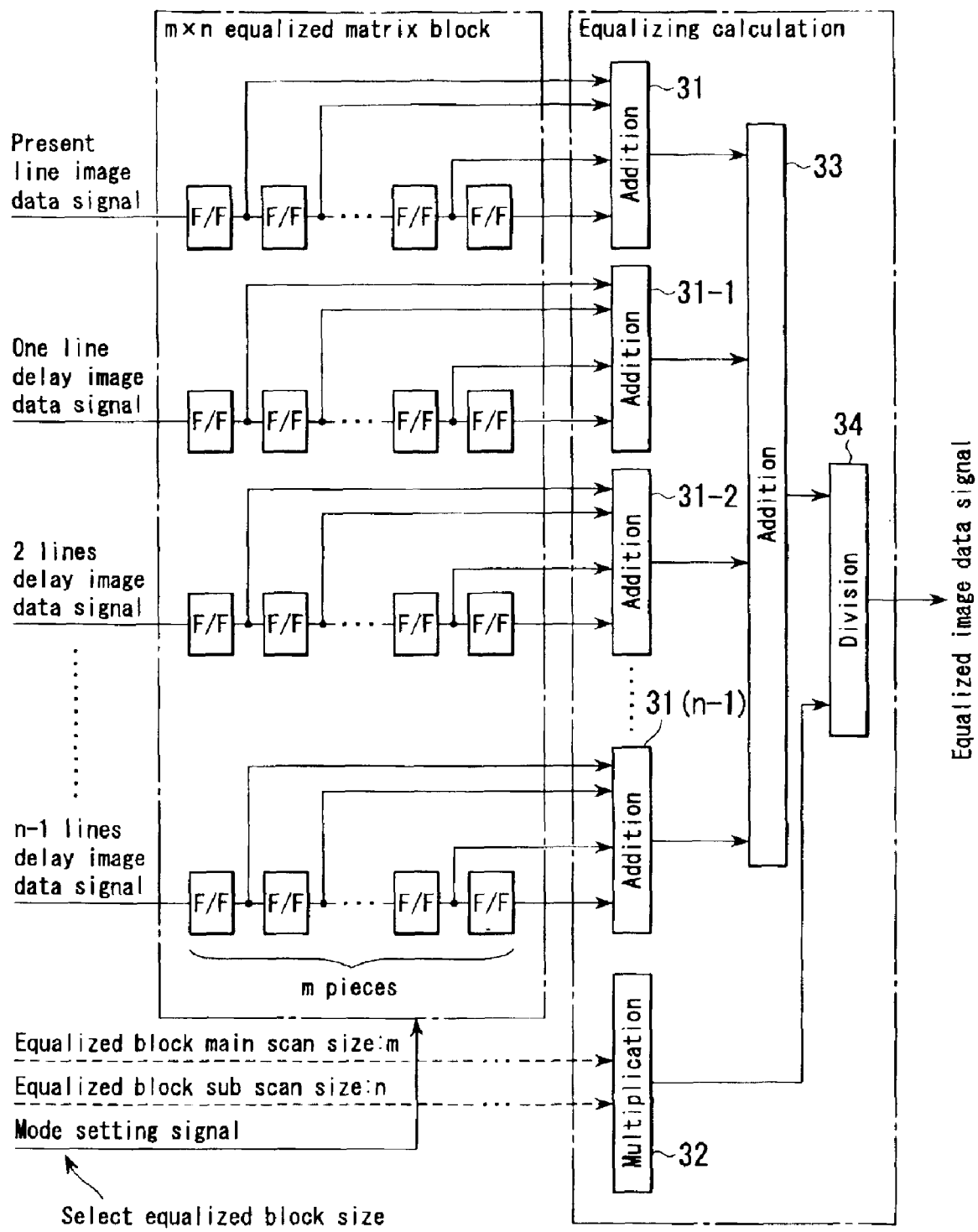
FIG. 8 is a view for illustrating a detailed constitution of an equalized matrix generating/calculating unit 21.

In this case, a detailed constitution of this equalizing matrix generating/calculating unit 21 is shown in FIG. 8. That is, for more details, this equalizing matrix generating/calculating unit 21 in the equalizing control unit 3 comprises a plurality of flip-flops (F/F), adder 31, 31-1 ... 31-(n−1), 33, a divider 34 and a multiplier 32.

According to such a constitution, the adder 31 adds a value of each pixel on the basis of a present line image data signal and the adder 31-1 adds a value of each pixel on the basis of one line image data signal. In the same way, the adder 31-(n−1) adds a value of each pixel on the basis of an n−1 line image data signal.

Thus, respective obtained added values are further added by the adder 33, the calculation by the use of a main scan size m of the equalized block and a subscan size n of the equalized block by the means of the multiplier 32 and the divider 34, so that an equalized image data signal is generated.

In this way, respective line image data delay signals are input to the equalizing control unit 3, the equalized matrix block generating/calculating unit 21 generates in this equalizing control unit 3 generates an equalized block. Further, the equalizing has been performed, with the result that an equalized image data signal is generated to be output. In this case, a size of the equalized block is equivalent to a size, which the CPU 12 sets with respect to the register setting unit 2. That is, a size of the equalized block is set on the basis of a mode setting signal, which is generated by the setting value count/mode generating unit 23. Alternatively, the equalizing is performed at a timing such that both of the main scan directional equalized clock signal and the subscan directional equalized clock signal, which are generated by the equalized clock generating unit 24, are "H".

Further, the above described mode setting signal, the n−1 line delay subscan directional image effective signal, the input main scan directional image effective signal and the equalized image data signal are transmitted to the equalized data/control signal delay adjusting unit 22. This equalized data/control signal delay adjusting unit 22 generates an equalized subscan directional image effective signal and an equalized main scan image effective signal on the basis of these signals and outputs them to the output control unit 4 and the output control signal generating unit 25.

This output control signal generating unit 25 receives an input of the subscan directional equalized clock signal in addition to the above described signals and generates an output control signal on the basis of these signals.

Alternatively, an input subscan directional equalized clock signal, an input main scan directional equalized clock signal and an input image data signal are input in the memory control signal generating unit 20. Then, the memory control signal generating unit 20 generates a memory control signal on the basis of these signals. Further, this memory control signal is feedback to the memory control unit 1.

On the other hand, the output control signal, the equalized subscan directional image effective signal, the equalized main scan directional image effective signal and the equalized image data signal each are transmitted to the output control unit 4.

While accumulating this equalized image data signal in an outside memory 13 for outputting, this output control unit 4 outputs it as an output image data signal at a timing which is decided on the basis of the output subscan directional image effective signal and the output main scan directional image effective signal.

With reference to FIGS. 9A, 9B, 10A to 10C, the equalizing by the use of the equalizing circuit according to the embodiment will be described more specifically below.

Figure 9A:
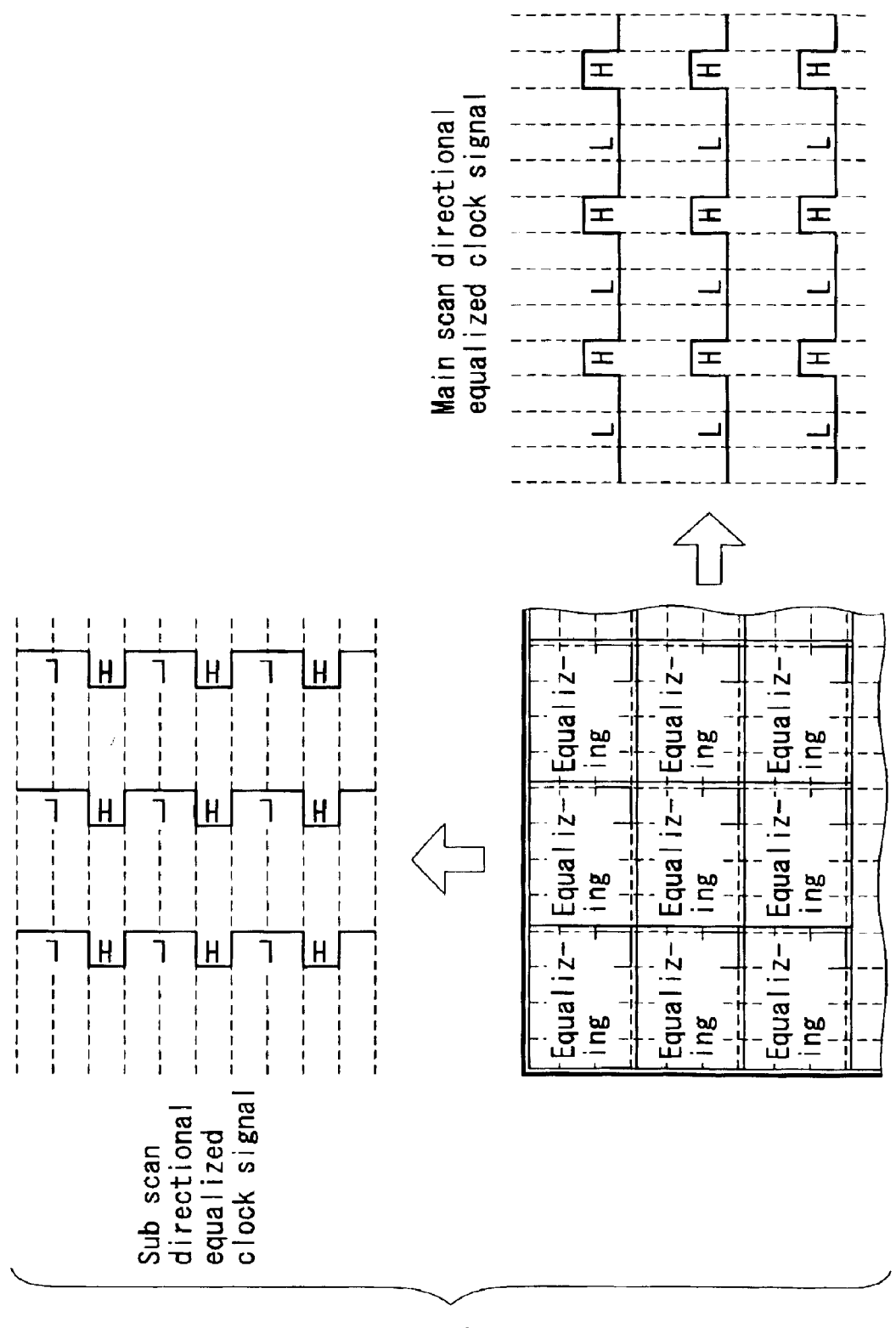
FIG. 9A is a conceptual diagram of the equalizing process when there is no skew (a grid shape) and FIG. 9B is a timing chart according to the equalizing process when there is no skew (a grid shape)
Figure 9B:
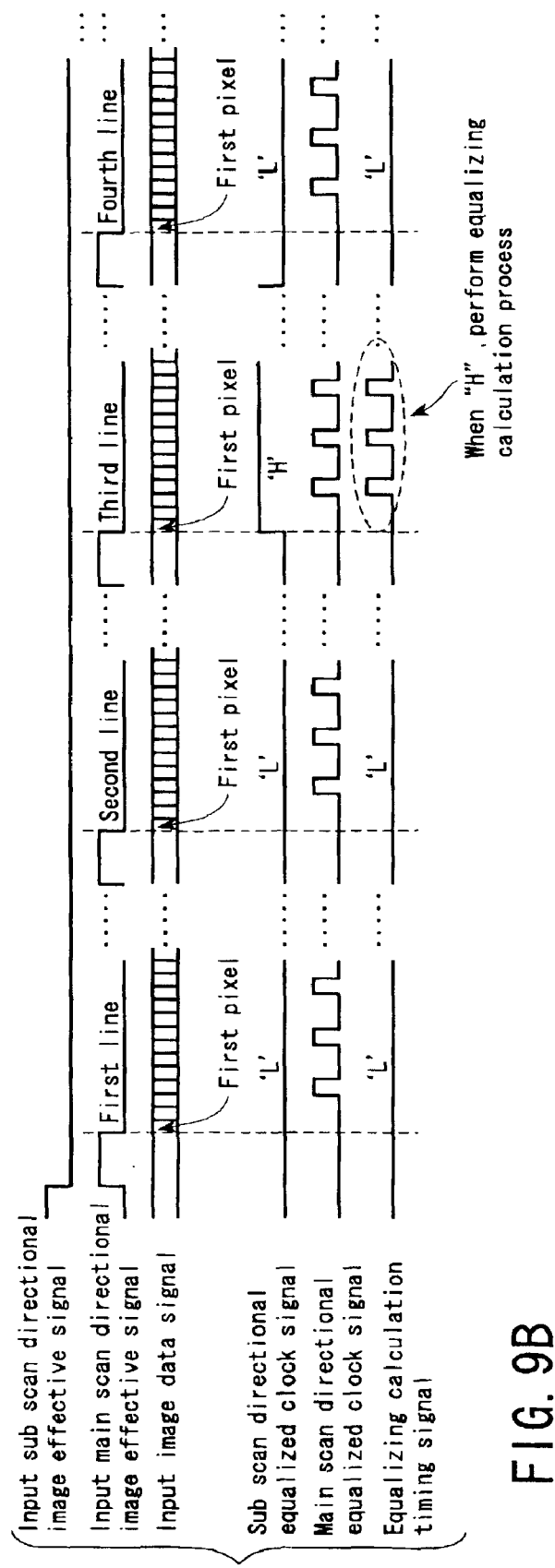

At first, FIG. 9A illustrates a conceptual diagram of the equalizing when there is no skew (a grid shape) and FIG. 9B illustrates a timing chart according to the process.

That is, the input image data signal is shown in a center diagram of FIG. 9A, the subscan directional image effective signal is shown in an upper diagram of FIG. 9A and the main scan directional image effective signal is shown in a right diagram of FIG. 9A.

As shown in FIG. 9A, when there is no skew of the equalized block, the equalizing is performed at a timing such that both of the main scan directional equalized clock signal and the subscan directional equalized clock signal are "H".

Alternatively, according to the embodiment, an equalizing calculation process position in the above equalizing process is shown in the central diagram of FIG. 9A in a small rectangular.

The above described calculation process will be described in more detail with reference to a timing chart shown in FIG. 9B below. After the input subscan directional image effective signal turns from "H" to "L", the input image data signals have been taken in till the input main scan directional image effective signal turns from "H" to "L" and it returns to "H". Then, if both of the main scan directional equalized clock signal and the subscan directional equalized clock signal are "H", the equalized calculation timing signal becomes "H", so that the equalizing is performed.

Figure 10A:
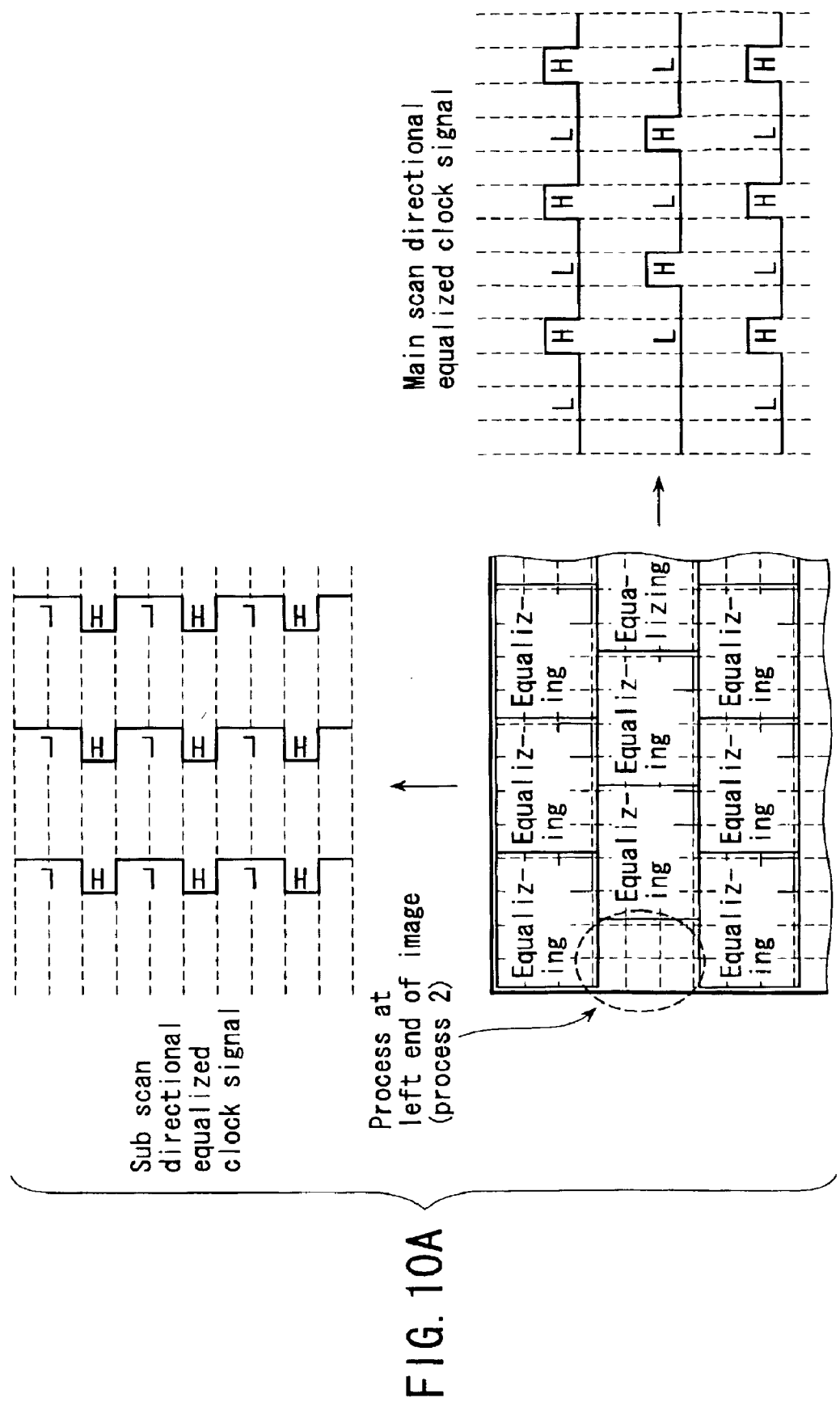
FIGS. 10A and 10B are conceptual diagrams of the calculation process when there is no skew (a grid shape) and FIG. 10C is a timing chart according to the calculation process when there is no skew (a grid shape)
Figure 10B:
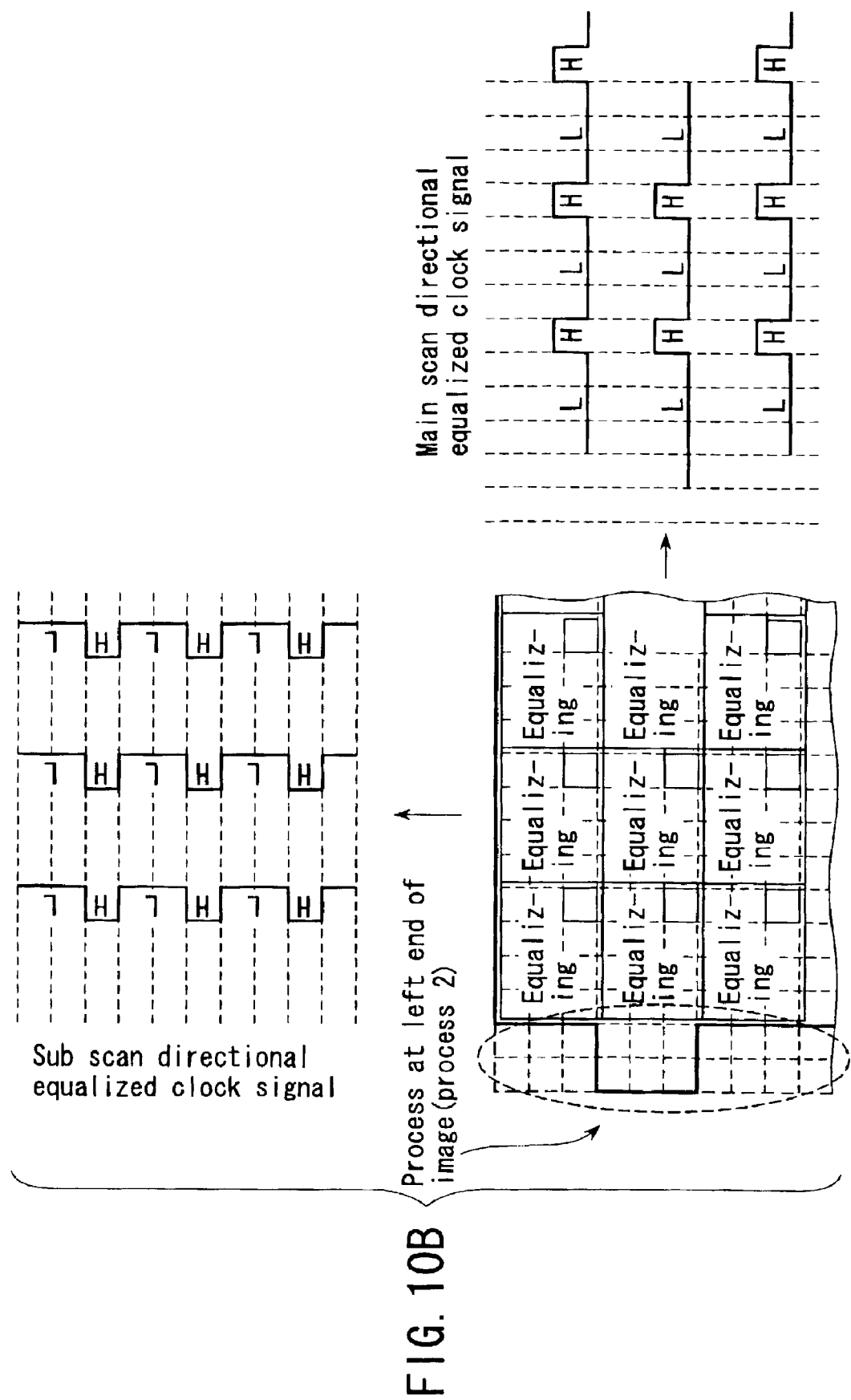
Figure 10C:
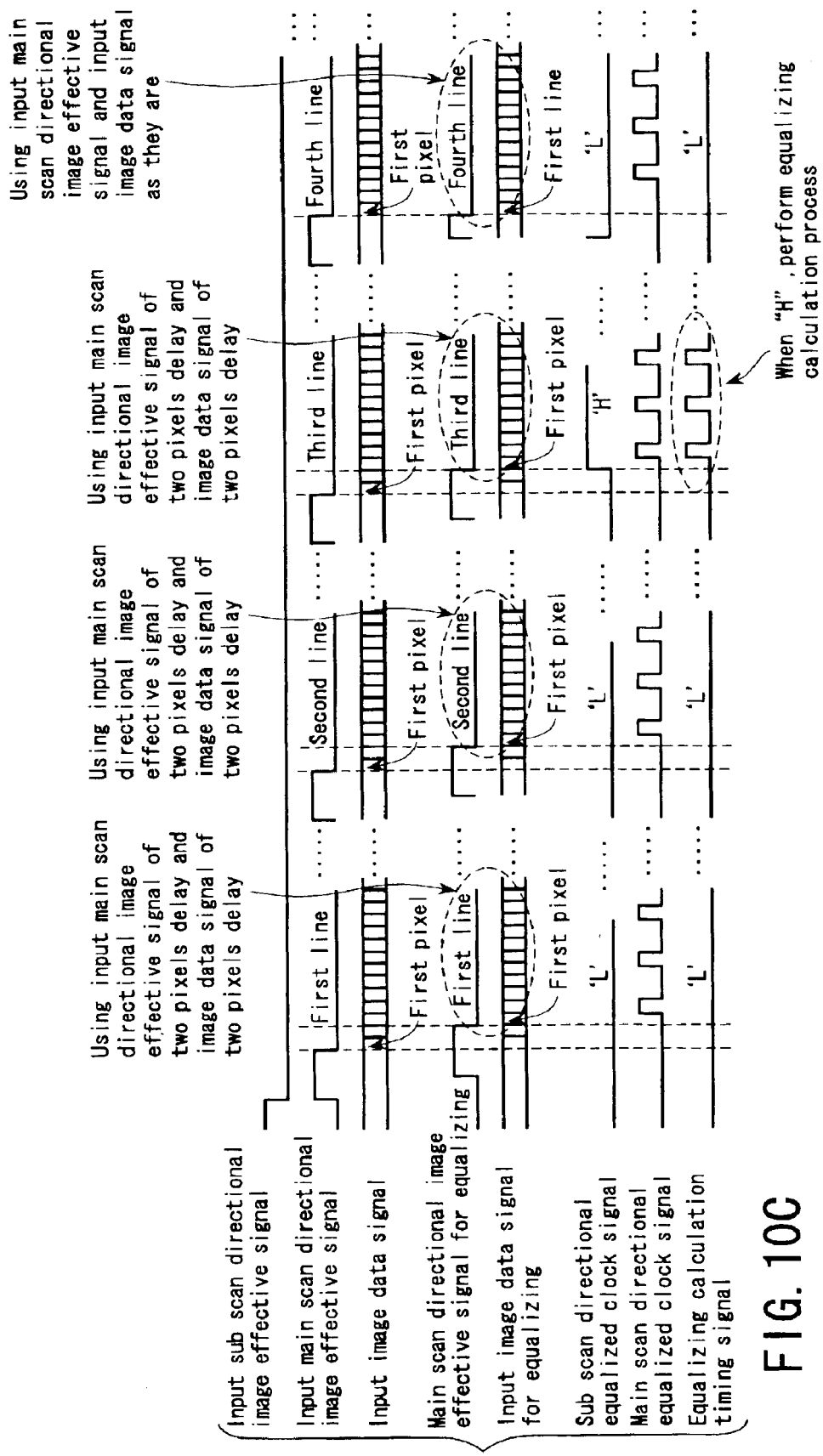

Next, FIG. 10A and FIG. 10B illustrate a conceptual diagrams of the calculation process when there is no skew (a grid shape) and FIG. 10C is a timing chart according to the present calculation process. That is, central diagrams of FIG. 10A and FIG. 10B show the input image data signal, the upper diagrams show the subscan directional equalized clock signal and the right diagrams show the main scan directional equalized clock signal.

As is obvious from FIG. 10A, when there is a skew of the equalized block, a timing such that the main scan directional equalized clock signal is "H" is not unified by a line. In view of these points, according to the embodiment, as shown in FIG. 10B, the main scan directional equalized clock signals are adjusted so that they become "H" at the same timing. Specifically, the input image data signal and the main scan directional image effective signal are delayed and the equalizing is performed.

The above described calculation process will be described in more detail with reference to a timing chart shown in FIG. 10C below. After the input subscan directional image effective signal turns from "H" to "L", the input image data signals have been taken in till the input main scan directional image effective signal turns from "H" to "L" and it returns to "H". Then, if both of the main scan directional equalized clock signal and the subscan directional equalized clock signal are "H", the equalized calculation timing signal becomes "H", so that the equalizing is performed.

However, according to the embodiment, a skew due to delay of two pixels exists depending on a line. Therefore, an input image data signal is taken in on the basis of the input main scan directional image effective signal, of which two pixels are delayed, with respect to the first to third lines in which the skew exists. The equalizing calculation process is performed on the basis of this taken input image data signal. With respect to the fourth to sixth lines, there is no skew, so that the input main scan directional image effective signal and the input image data signal are used as they are and a normal process is performed.

Alternatively, a predetermined delay is realized depending on a mode setting signal which is generated by the setting value count/mode generating unit 23, with the result that an equalized image data signal and an equalized main scan directional image effective signal are generated. The equalizing control unit 3 outputs this equalized image data signal. Alternatively, the above mode setting signal is generated in the register setting unit 2 on the basis of a skew value to be set by the outside CPU 12.

In this way, the output control unit 4 writes the equalized image data signal in the output memory 13 for outputting for each subscan size line of the equalized block (i.e., for each line in which the subscan directional equalized clock signal to be output from the equalized clock generating unit 24 in the equalizing control unit 3 is "H"). Then, the output control unit 4 appropriately reads out the equalized image data signal and it is output to the outside as an input image data signal.

Figure 11:
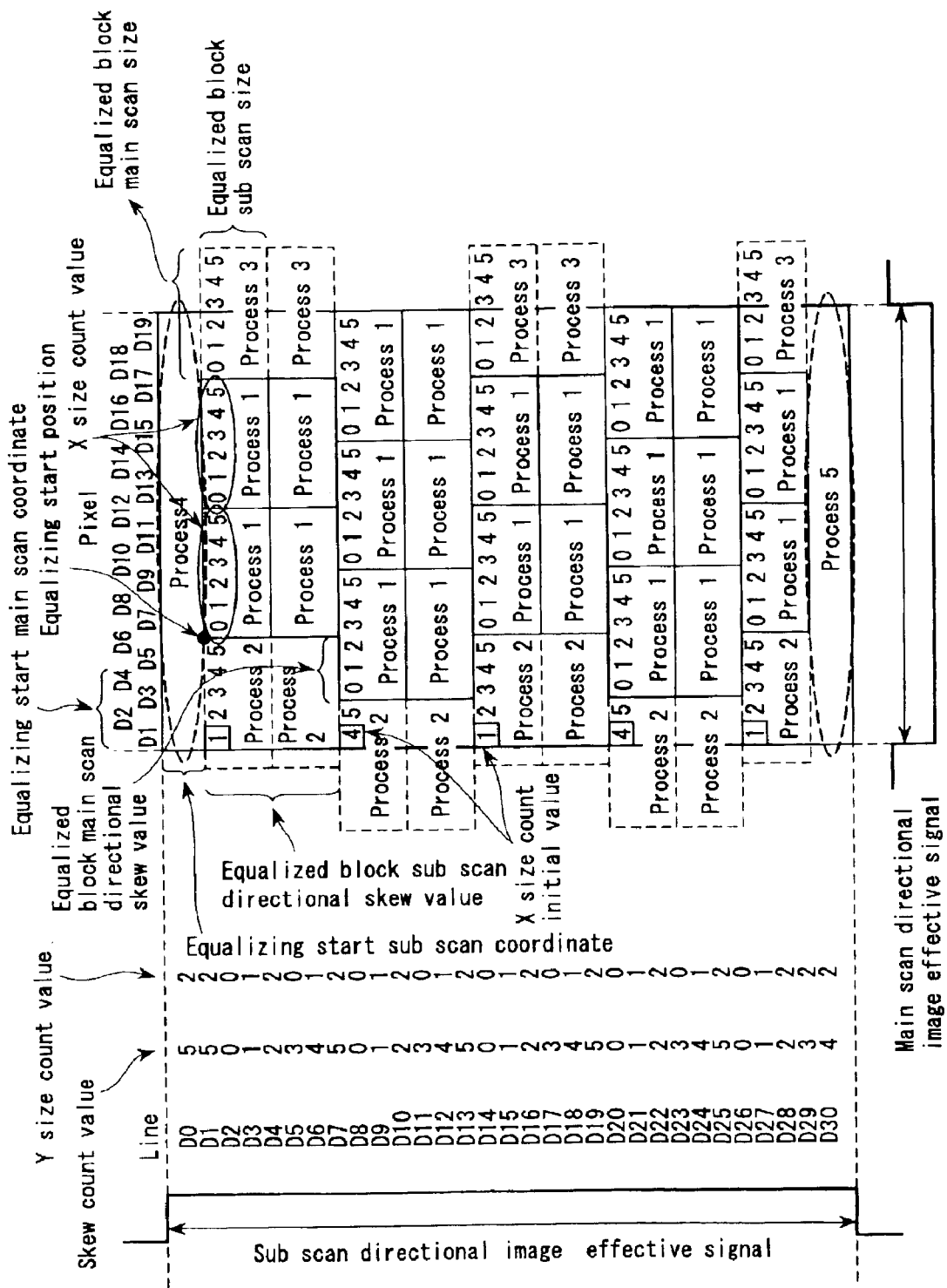
FIG. 11 is a view for illustrating respective setting values.

With reference to FIG. 11, each setting values will be explained below.

In FIG. 11, an equalizing start position means a position plotted by a black circle. In this first embodiment, it is possible to arbitrarily set the equalizing start position.

Further, an equalized block is defined as a matrix of a main scan size of the equalized block x a subscan size of the equalized block. According to this example, since the equalized block is defined as 6×3, an X size count value is defined in the range of 0 to 5 and a Y size count value is defined in the range of 0 to 2. An X size count initial value is defined as a first pixel on a first line of each block, which is represented by a rectangular in FIG. 11. An equalizing start main scan coordinate and an equalizing start subscan coordinate are allocated to respective pixels, so that they can be specified.

In addition to these, an equalized block main scan directional skew value and an equalized block subscan directional skew value are defined as shown in the drawing.

Next, with reference to FIG. 12, a process for processing one page image by an equalizing circuit to be employed in an image processing circuit according to an embodiment will be explained below.

Figure 12:
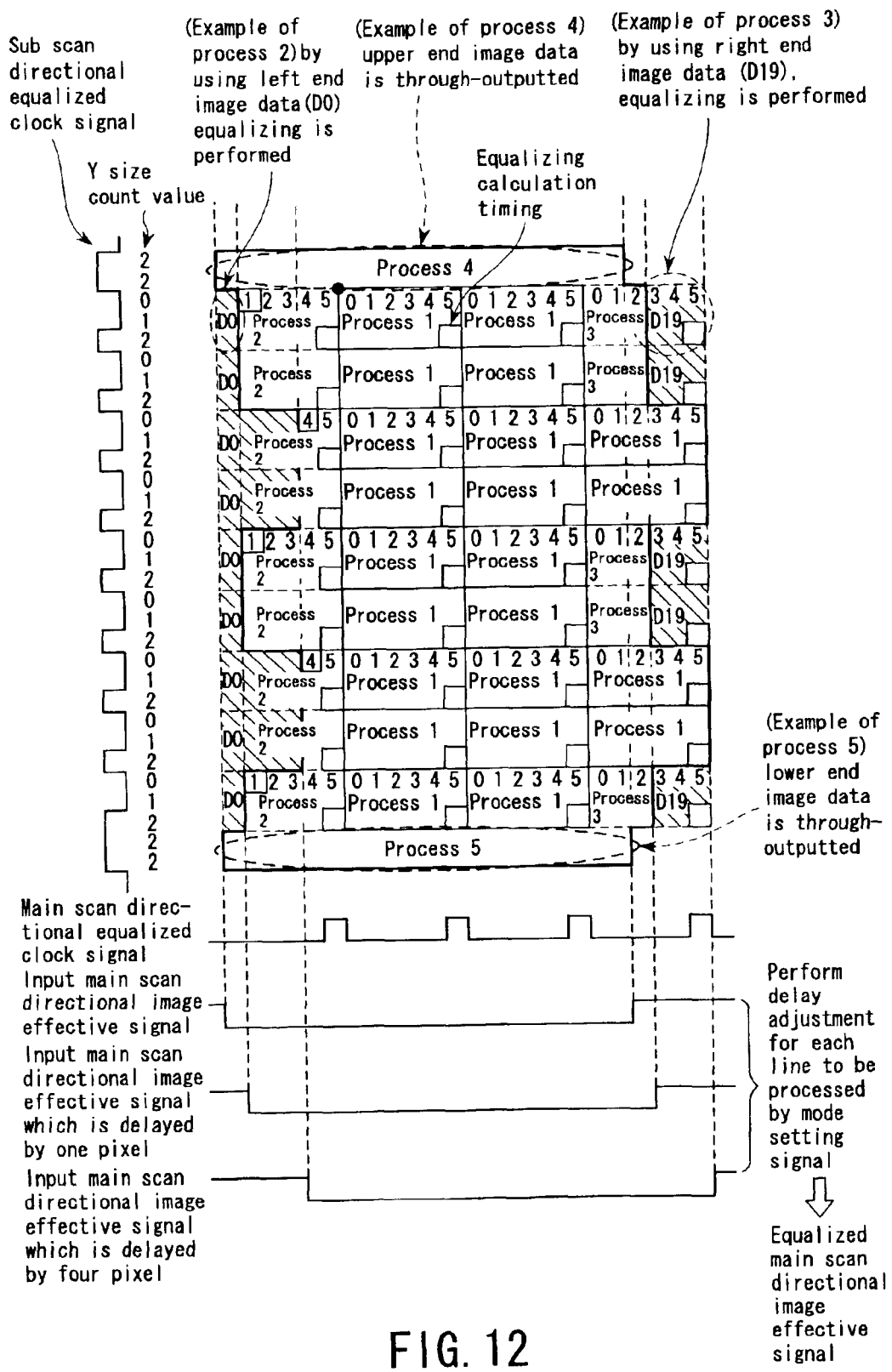
FIG. 12 is a view for explaining a process for processing one page image by an equalizing circuit to be employed in an image processing circuit according to an embodiment of the present invention.

As shown in this FIG. 12, in this example, it is assumed that the equalized block is defined as a matrix of 6×3, so that a subscan directional equalized clock signal becomes "H" for every three lines and a main scan directional equalized clock signal becomes "H" for every six pixels. Then, the delay of an input main scan directional image effective signal is adjusted by a mode setting signal for each line to be processed, so that an input main scan directional image effective signal which is delayed by one pixel and an input main scan directional image effective signal which is delayed by four pixels or the like are generated.

According to the present example, the image data at the upper end is through-output on the basis of the process 4, the image data at the lower end is through-output on the basis of the process 5. The image data at the left end (D0) performs the equalizing on the basis of the process 2 and the image data at the right end (D19) performs the equalizing on the basis of the process 3.

Figure 13:
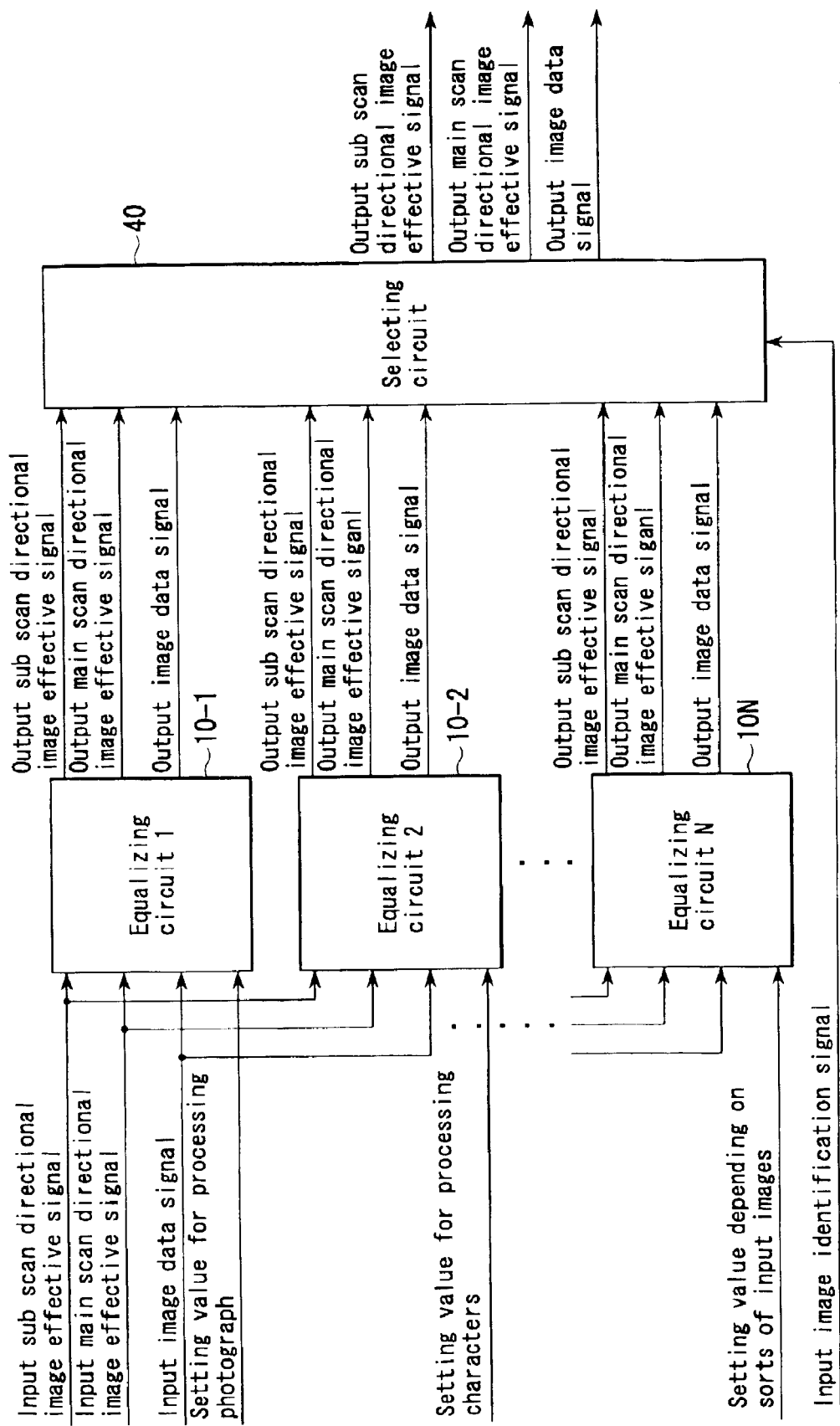

As shown in FIG. 13, when a plurality of equalizing circuits to be employed for an embodiment of the present invention are used depending on an application for a photograph and a character or the like, it is possible to perform the equalizing suitable for sorts of an input image. In this case, respective outputs of a plurality of equalizing circuits 10-1, 10-2, . . . 10-N (an output subscan directional image effective signal, an output main scan directional image effective signal and an output image data signal) are selected as a negative (−) by a selecting circuit 40 to be output. In this case, an input image identification signal identifies the type among a photograph and a character or the like to which the image belongs.

As mentioned above, according to this embodiment, when there is a skew of the equalized block, considering that timing, at which the main scan directional equalized clock signal becomes "H", is not unified by a line, the main scan directional equalized clock signals are adjusted so that they become "H" at the same timing and the image data signal and the main scan directional image effective signal are delayed, so that the equalizing calculation is performed. It will be described in more detail below how to perform the equalizing calculation according to the above described series of processes.

At first, FIGS. 14 to 17 illustrate an example of the equalizing calculation process when the main scan directional equalized clock signals as shown in the embodiment are not adjusted so that they become "H" at the same timing and its flow will be described in detail below.

Figure 14:
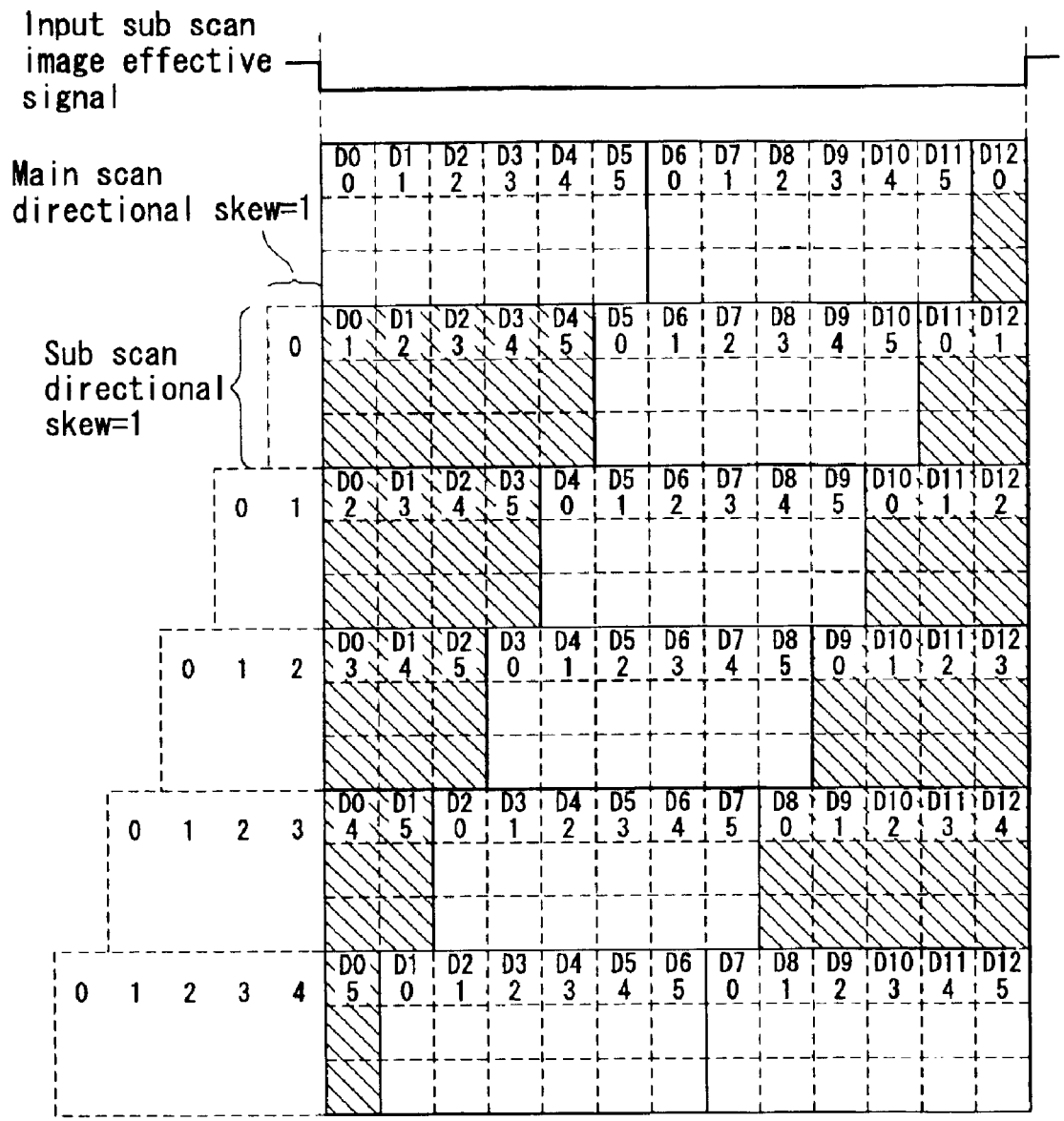
FIG. 14 is a view for illustrating an image of the processing when the adjustment according to the embodiment is not performed and an equalized matrix comprises a matrix of 6×3.
Figure 15:
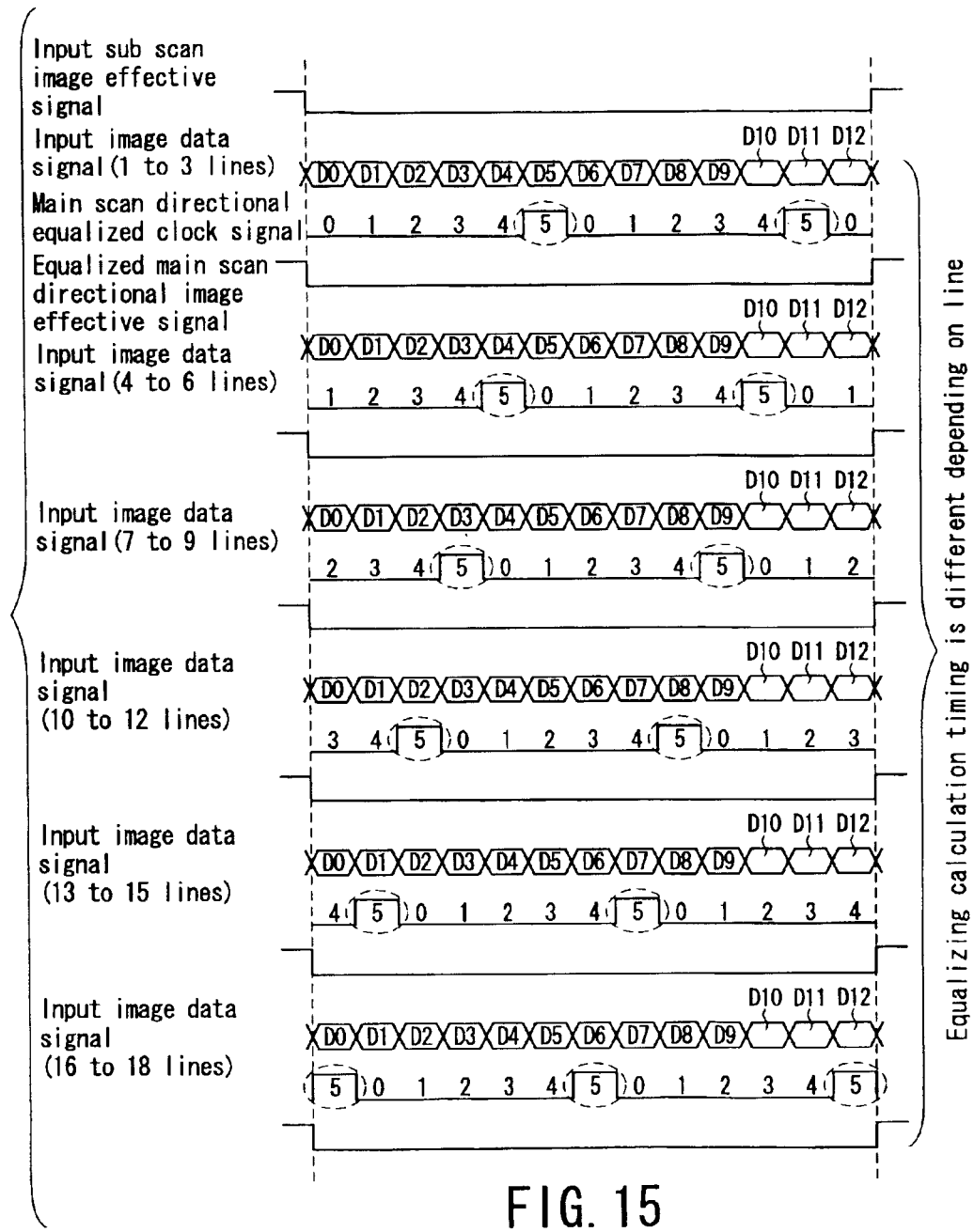
FIG. 15 is a timing chart of the processing when the adjustment according to the embodiment is not performed and an equalized matrix comprises a matrix of 6×3.

That is, FIG. 14 illustrates an image of the process when an equalized matrix is defined as 6×3 and FIG. 15 shows a timing chart of the process.

In this case, although there is no skew in first to third lines, in fourth to sixth lines, there is one skew in the main scan direction, in seventh to ninth lines, there are two skews in the main scan direction, in tenth to twelfth lines, there are three skews in the main scan direction, in thirteenth to fifteenth lines, there are four skews in the main scan direction and in fifteenth to eighteenth lines, there are five skews in the main scan direction. Then, there are such skews, with the result that, as shown in FIG. 15 and as being obvious from the main scan directional equalized clock signal, the timing of the equalizing calculation is different depending on a line.

Figure 16:
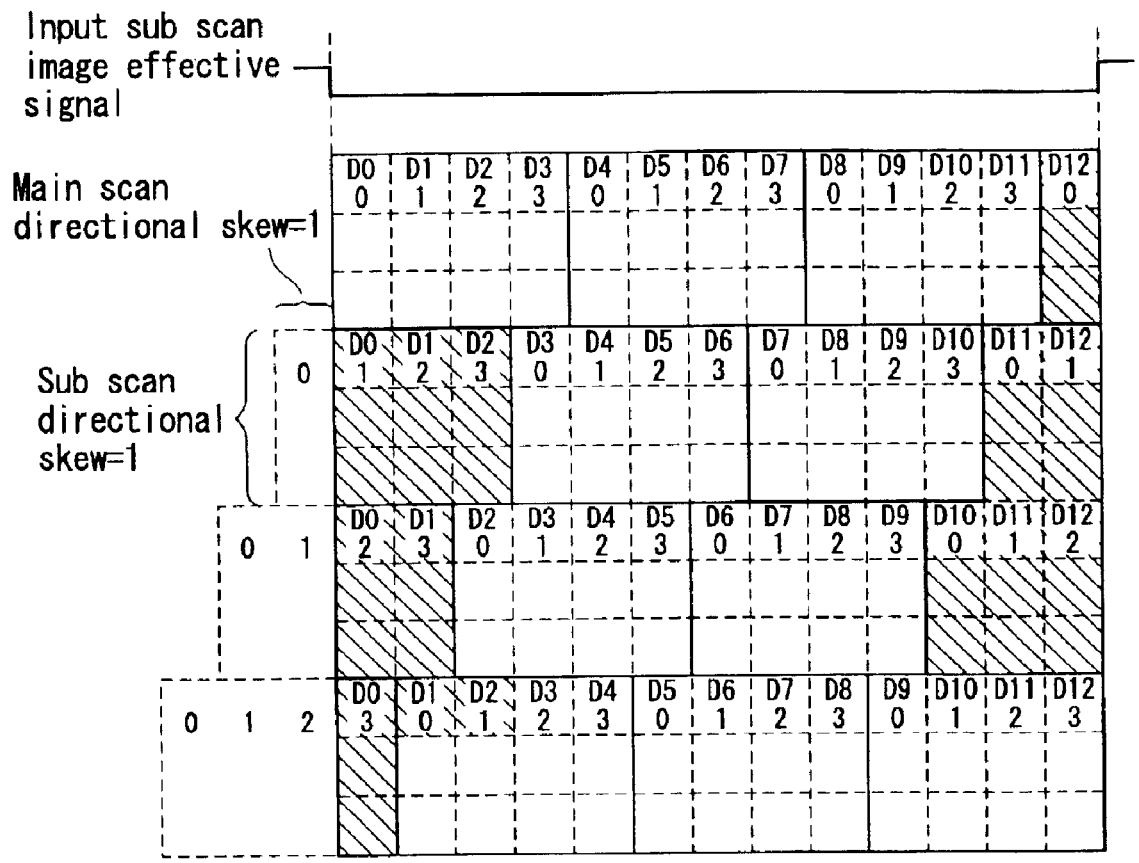
FIG. 16 is a view for illustrating an image of the processing when the adjustment according to the embodiment is not performed and an equalized matrix comprises a matrix of 4×3.
Figure 16:
Figure 16:
Figure 17:
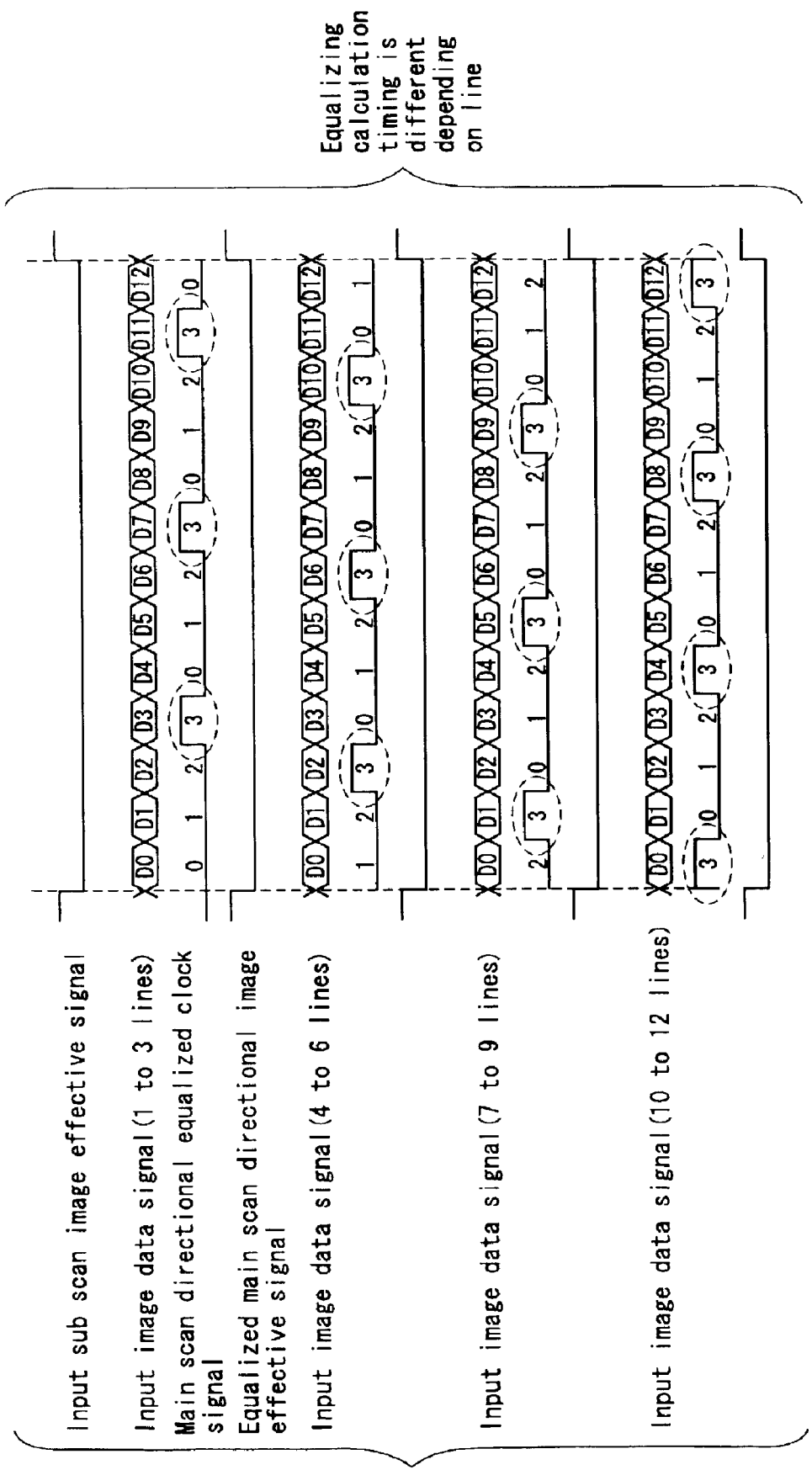
FIG. 17 is a timing chart of the processing when the adjustment according to the embodiment is not performed and an equalized matrix comprises a matrix of 6×3.

In the same way, FIG. 16 illustrates an image of the process when an equalized matrix is defined as 4×3 and FIG. 17 shows a timing chart of the process.

In this case, although there is no skew in first to third lines, in fourth to sixth lines, there is one skew in the main scan direction, in seventh to ninth lines, there are two skews in the main scan direction, in tenth to twelfth lines and there are three skews in the main scan direction.

Then, there are such skews, with the result that, as shown in FIG. 17 and as being obvious from the main scan directional equalized clock signal, the timing of the equalizing calculation is different depending on a line.

Conversely, FIGS. 18 to 21 illustrate an example of the equalizing calculation when the adjustment according to the embodiment is performed and its flow will be described in detail below.

Figure 18:
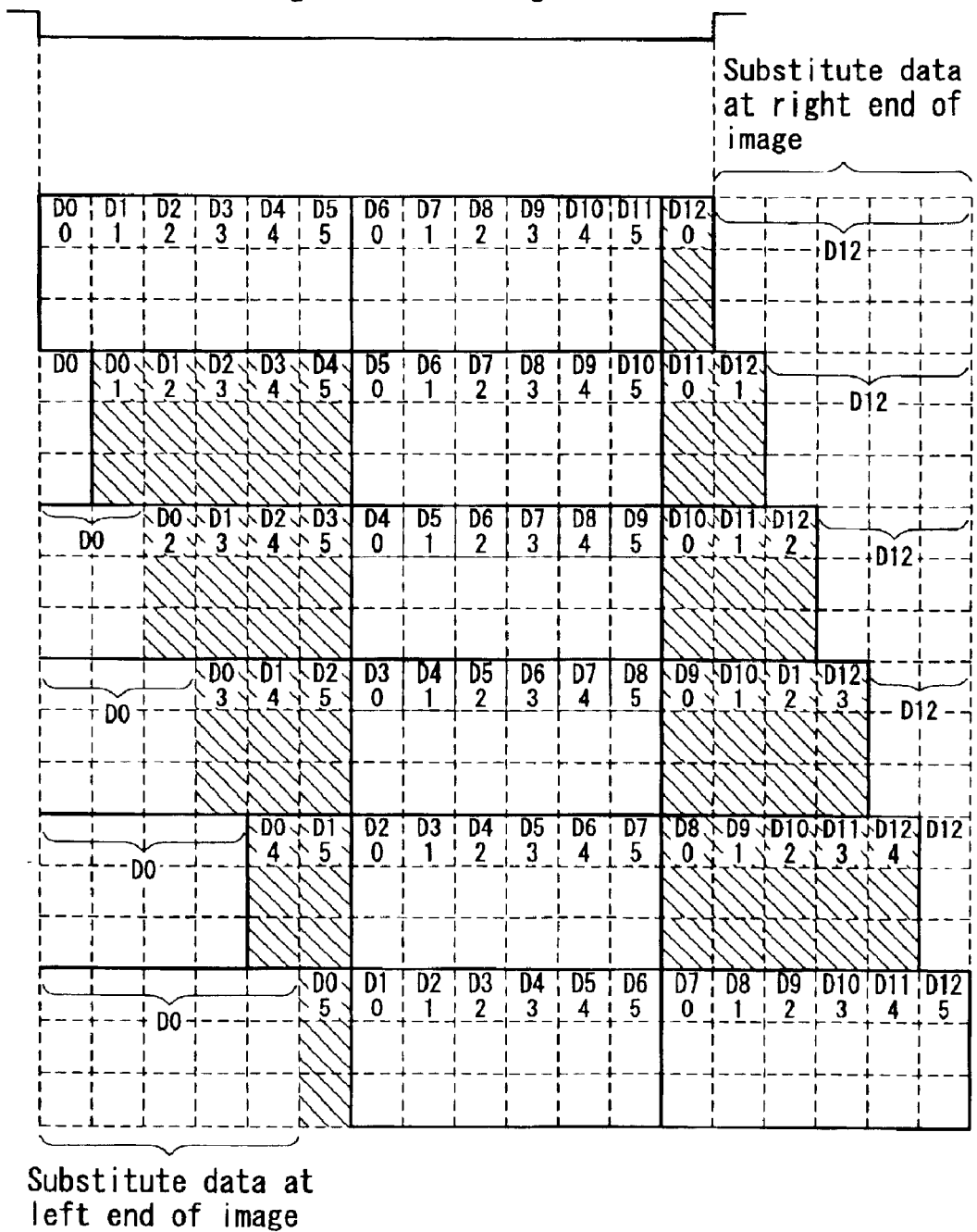
FIG. 18 is a view for illustrating an image of the processing when the adjustment according to the embodiment is performed and an equalized matrix comprises a matrix of 6×3.
Figure 19:
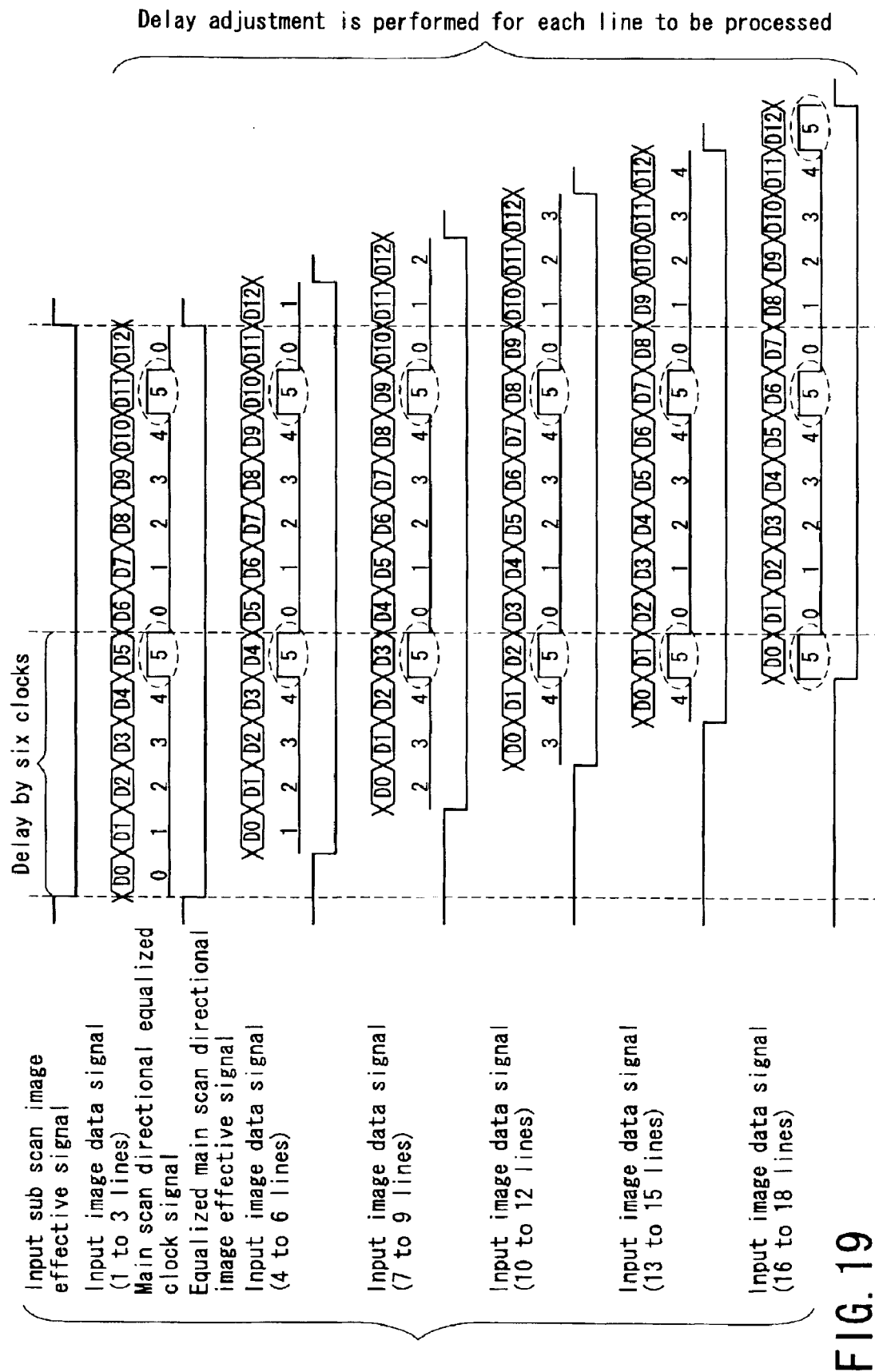
FIG. 19 is a timing chart of the processing when the adjustment according to the embodiment is performed and an equalized matrix comprises a matrix of 6×3.

At first, FIG. 18 illustrates an image when an equalized matrix comprises a matrix of 6×3 and FIG. 19 shows a timing chart of the process.

That is, as shown in this FIG. 18, although there is no skew in first to third lines, in fourth to sixth lines, there is one skew in the main scan direction, in seventh to ninth lines, there are two skews in the main scan direction, in tenth to twelfth lines, there are three skews in the main scan direction, in thirteenth to fifteenth lines, there are four skews in the main scan direction and in fifteenth to eighteenth lines, there are five skews in the main scan direction.

Therefore, as shown in FIG. 19, the input subscan image effective signal is delayed by six clocks. Then, in the fourth to sixth lines, the main scan directional image effective signal is delayed by one clock, in the seventh to ninth lines, the main scan directional image effective signal is delayed by two clocks, in the tenth to twelfth lines, the main scan directional image effective signal is delayed by three clocks, in the thirteenth to fifteenth lines, the main scan directional image effective signal is delayed by four clocks and in the fifteenth to eighteenth lines, the main scan directional image effective signal respectively is delayed by five clocks.

In this way, by adjusting the delay for each line to be equalized, the timing of equalizing is unified with respect to all lines.

Figure 20:
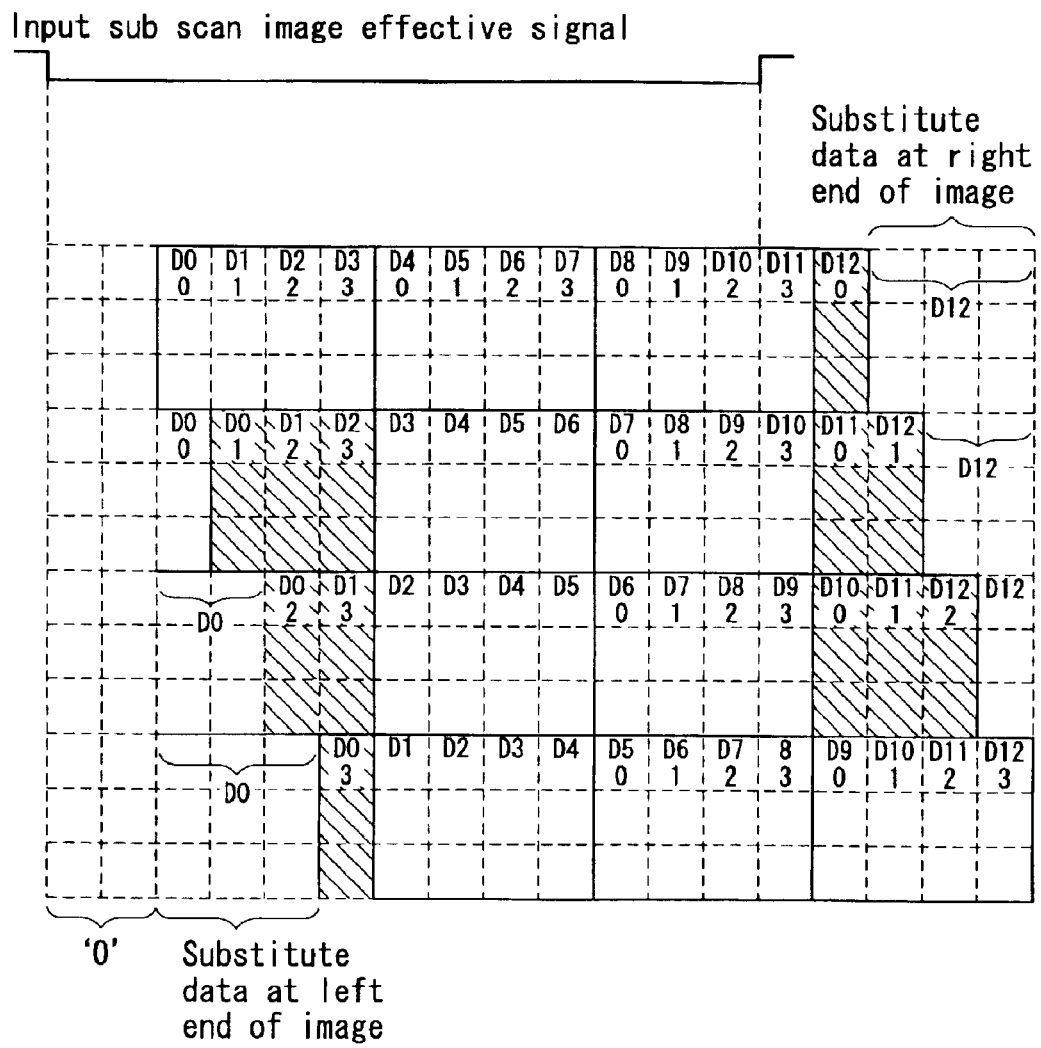
FIG. 20 is a view for illustrating an image of the processing when the adjustment according to the embodiment is performed and an equalized matrix comprises a matrix of 4×3.
Figure 21:
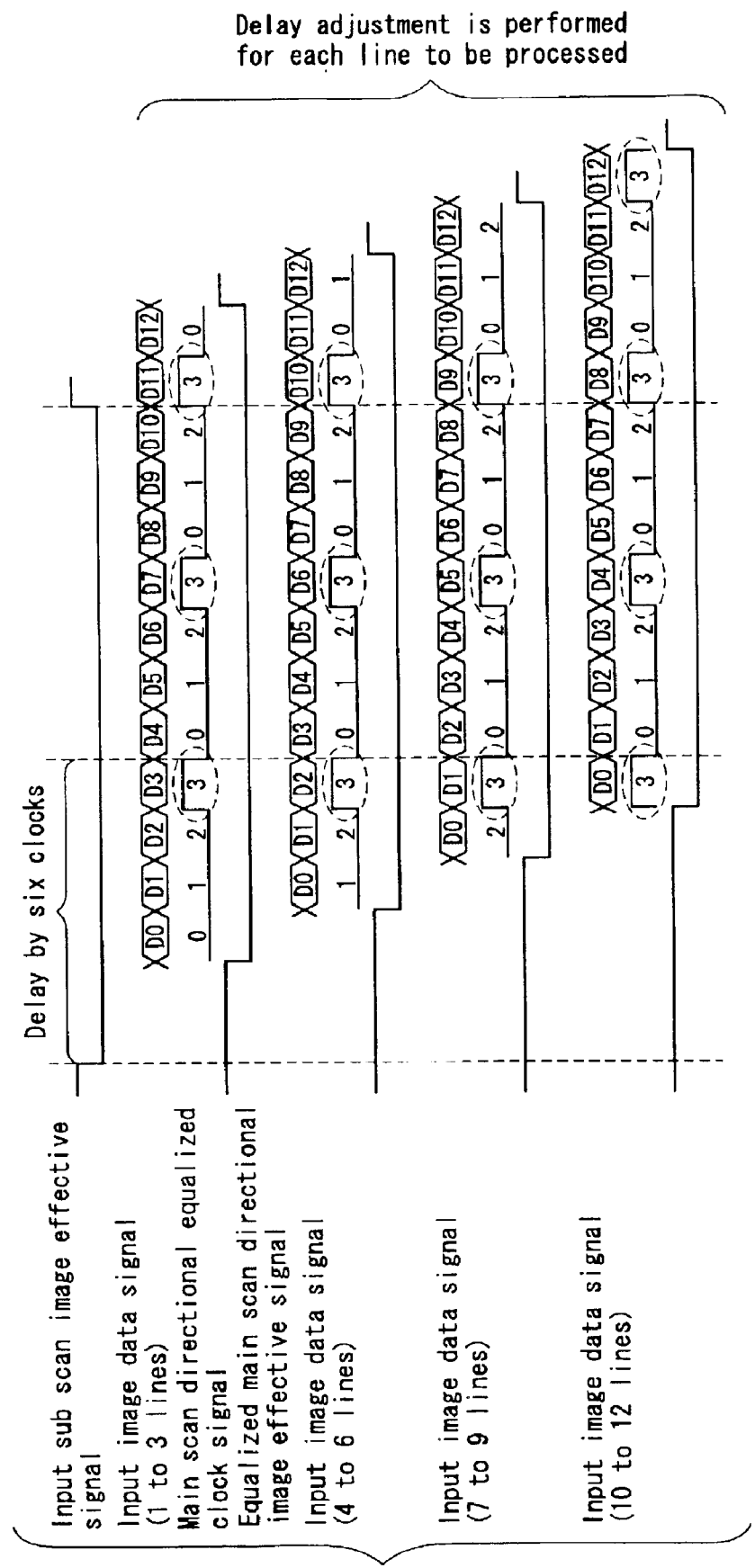
FIG. 21 is a timing chart is a timing chart of the processing when the adjustment according to the embodiment is performed and an equalized matrix comprises a matrix of 6×3.

In the same way, FIG. 20 illustrates an image when an equalized matrix comprises a matrix of 4×3 and FIG. 21 shows a timing chart of the processing.

That is, according to this example, as shown in FIG. 20, in fourth to sixth lines, there is one skew in the main scan direction, in seventh to ninth lines, there are two skews in the main scan direction and in tenth to twelfth lines, there are three skews in the main scan direction.

Therefore, as shown in FIG. 21, the input subscan image effective signal is delayed by six clocks. Then, in the fourth to sixth lines, the main scan directional image effective signal is delayed by one clock, in the seventh to ninth lines, the main scan directional image effective signal is delayed by two clocks and in the tenth to twelfth lines, the main scan directional image effective signal is delayed by three clocks, respectively. Also in this case, by adjusting the delay for each line to be equalized, the timing of equalizing is unified with respect to all lines.

Alternatively, a predetermined delay process is performed in accordance with a mode setting signal to be generated by the setting value count/mode generating unit 23 in the equalizing control unit 3, with the result that the above described main scan directional image effective signal is generated.

In this case, in order to enable a plurality of equalized matrices to be set, it is necessary to provide a plurality of equalized matrix block generating/calculating units 21.

Figure 22:
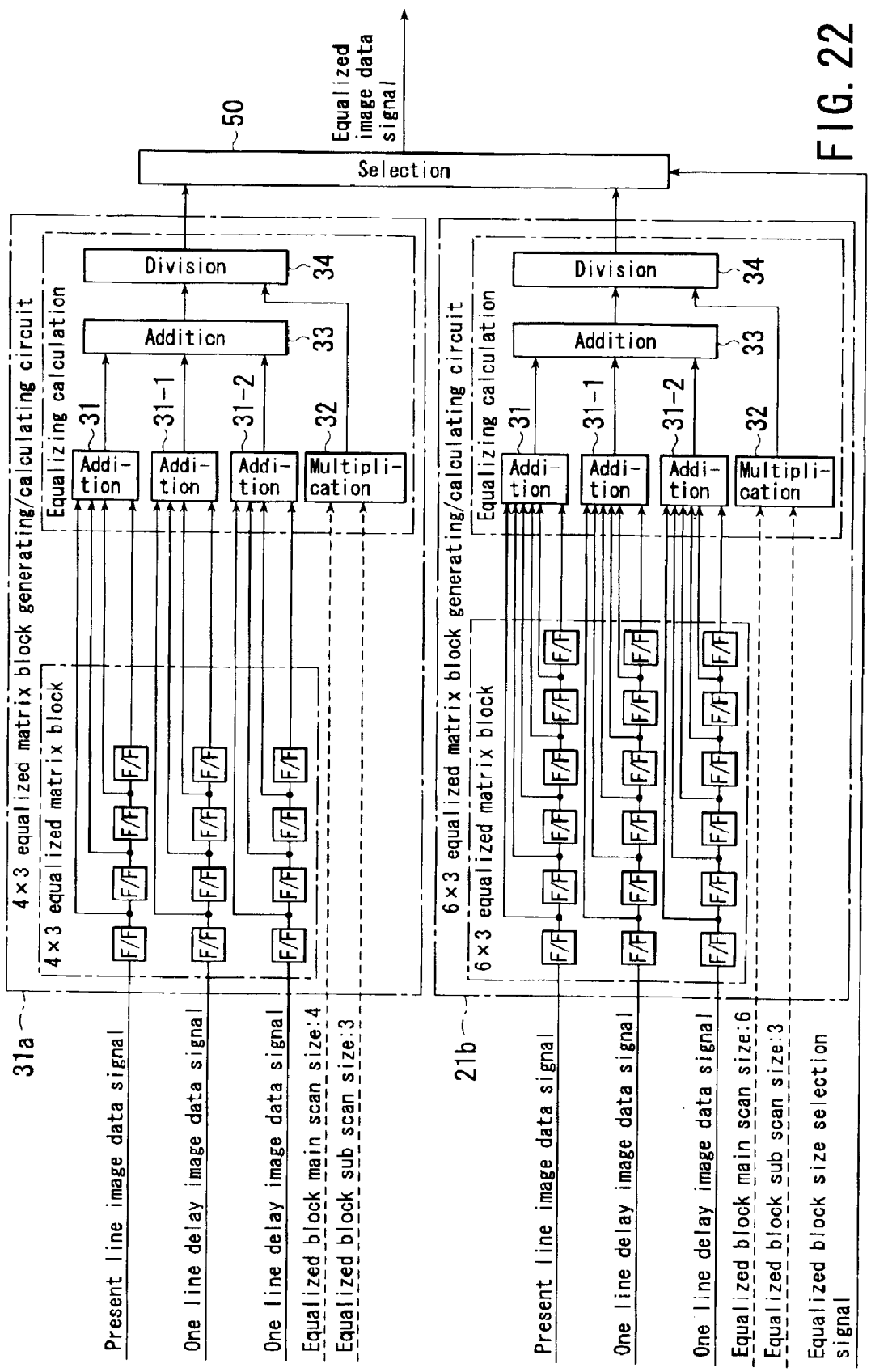
FIG. 22 is a constitutional view of an image processing circuit, in which a plurality of equalizing circuits capable of setting two sorts of equalized matrices, i.e., 4×3 and 6×3.

For example, in order to enable two sorts of equalized matrices, i.e., 4×3 and 6×3 to be set, a constitution shown in FIG. 22 are employed.

According to this constitution shown in FIG. 22, an equalized matrix block generating/calculating unit 21a in accordance with the equalized matrix of 4×3 and an equalized matrix block generating/calculating unit 21b in accordance with the equalized matrix of 6×3 are provided, so that a selecting unit 50 outputs one of these outputs as an equalized image data signal.

Alternatively, the details of each of the equalized matrix block generating/calculating unit 21a and 21b are the same as those in FIG. 8 basically, so that the explanation thereof is not repeated here.

Figure 23:
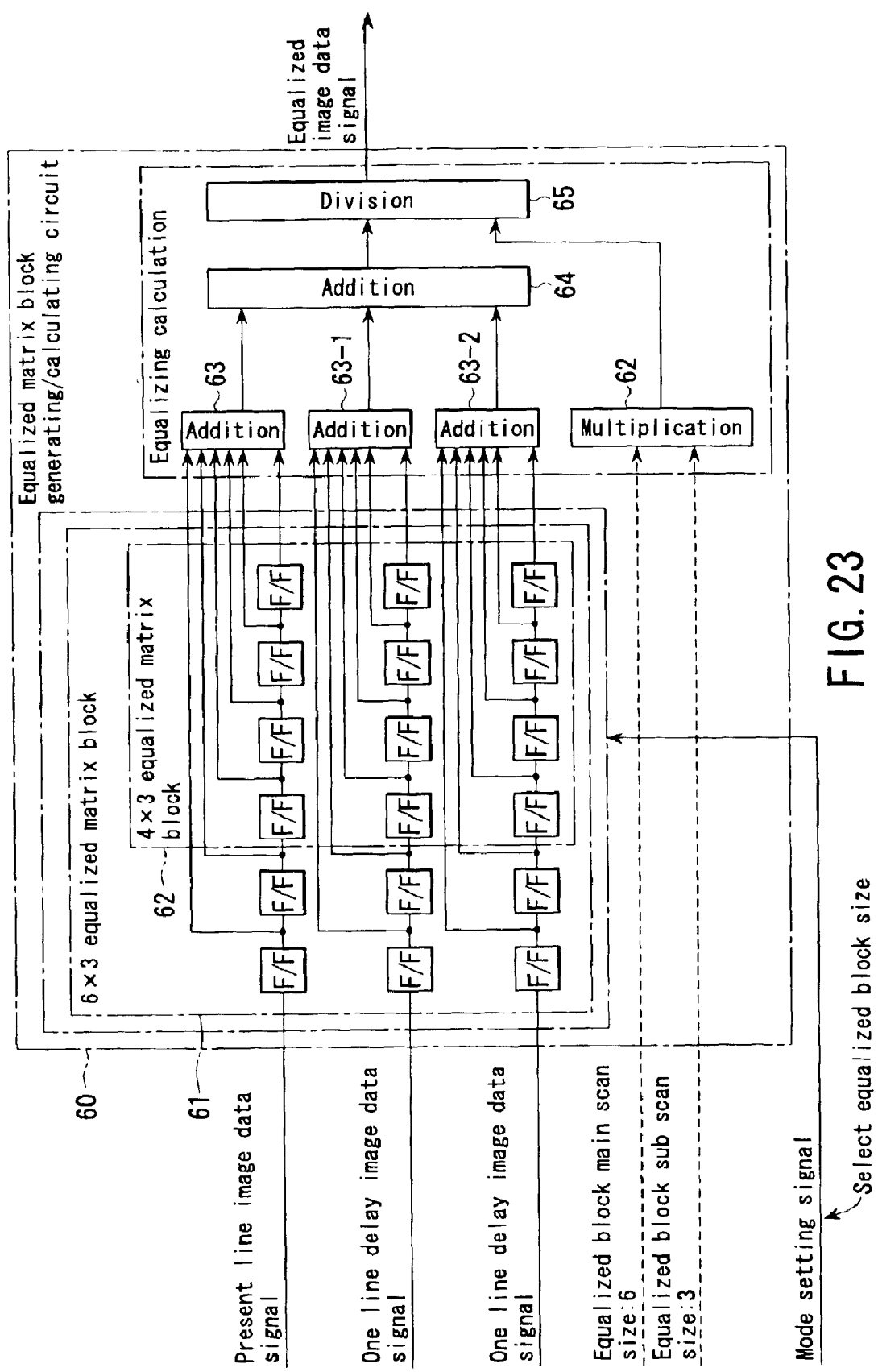
FIG. 23 is a constitutional view of an image processing circuit capable of setting two sorts of equalized matrices, i.e., 4×3 and 6×3 by a single equalizing circuit.

In place of the above mentioned constitutions, according to an embodiment of the present invention, an equalized matrix block generating/calculating unit 60 as shown in FIG. 23 can be employed.

That is, an adder 63 adds a value of each pixel on the basis of image data signal at a present line and an adder 63-1 adds a value of each pixel on the basis of the image data signal at a line delayed by one line. In the same way, an adder 63-2 adds a value of each pixel on the basis of the image data signal at a line delayed by two lines. In this time, the mode setting signal selects between 6×3 or 4×3 for the equalized block sizes. That is, a plurality of equalized matrix block generating/calculating circuits in accordance with each equalized block size as a constitution shown in FIG. 22 are not provided but one circuit is substitutable.

An adder 64 further adds respective additional values which are obtained in this way and a multiplier 62 and a divider 65 calculates by the use of the equalized block main scan size and the equalized block subscan size so as to generate an equalized image data signal.

As mentioned in detail above, according to the embodiment of the present invention, the following effects will be realized.

That is, according to the embodiment of the present invention, it is possible to arbitrarily set a subscan position and a main scan position for starting the equalizing of the input image data signal. More specifically, it is possible to set a phase of a block to be equalized. Further, it is also possible to set a block size for equalizing the image data signal as an arbitrary size.

Alternatively, a skew in the equalized block of the input image data signal can be set and the equalizing can be performed both in a grid shape and an angled shape.

Further, according to the embodiment of the present invention, it is possible to use the equalized matrix block generating/calculating unit in common independently of a size of the equalized block, so that a size of a circuit can be reduced. Then, it becomes possible to perform the equalizing calculation process at certain timing independently of a skew of the equalized block. In addition to them, by using a plurality of equalizing circuits according to the embodiment of the present invention, it is certain that the equalizing depending on the type of the input image data (i.e., a photograph and a character or the like) can be performed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An equalizing circuit comprising:
   a memory control unit which receives an input of an input image data signal;
   a register setting unit which receives setting of a main scan coordinate and a subscan coordinate to start at least the equalizing of the input image data signal;
   an equalizing control unit which starts the equalizing of the input image data signal from the main scan coordinate and the subscan coordinate, which are set by the register setting unit, and outputs the equalized image data signal; and
   an output control unit which receives an input of an equalized image data signal from the equalizing control unit and outputs it as an output image data signals,
   wherein the equalizing control unit performs a predetermined process outside of an output image region at least at an upper end, a lower end, a right end and left end of the input image data signal.

2. An equalizing circuit according to claim 1, wherein the register setting unit receives setting with respect to a size of an equalized block as an unit for equalizing the input image data.

3. An equalizing circuit according to claim 1, wherein the register setting unit receives setting of a skew value of an equalized block as an unit for equalizing the input image data.

4. An equalizing circuit according to claim 1, wherein the memory control unit delays the input image data signal by lines and controls the delayed input image data signal so that it is output to the equalizing control unit.

5. An equalizing circuit according to claim 1, where the equalizing control unit further has an equalized matrix generating/calculating circuit which is used in common independently of a size of the equalized block.

6. An equalizing circuit according to claim 1, wherein the equalizing control unit performs a predetermined delay adjustment in such a manner that it performs the equalizing at a certain timing independently of a skew value of the equalized block.

7. An image processing circuit comprising:
   a memory control unit which receives an input of an input image data signal;
   a first memory which stores the input image data signal after delaying it;
   a CPU which designates at least any one of a main scan coordinate and a subscan coordinate to start equalizing of the input image data signal, a main scan size and a subscan size of the equalized block and skew values in a main scan direction in a subscan direction of the equalized block;
   a register setting unit which holds the setting information which is designated by the CPU;
   an equalizing control unit which performs the equalizing of the input image data signal at a certain timing independently of a skew value of the equalized block on the basis of the setting information held by the register setting unit and outputs the equalized image data signal;
   a second memory which receives an input of the equalized image data signal from the equalizing control unit and holds it as an output image data signal; and
   an output control unit which outputs the output image data of the second memory,
   wherein the eaualizing control unit performs a predetermined process outside of an output image region at least at an upper end, a lower end, a right end and left end of the input image data signal.

8. An image processing circuit according to claim 7, wherein the equalizing control unit further has an equalized matrix generating/calculating circuit which is used in common independently of a size of the equalized block.

9. An equalizing circuit comprising:

memory control means for receiving an input of an input image data signal;

register setting means for receiving setting of a main scan coordinate and a subscan coordinate to start at least the equalizing of the input image data signal;

equalizing control means for starting the equalizing of the input image data signal from the main scan coordinate and the subscan coordinate, which are set by the register setting unit, and outputting the equalized image data signal; and output control means for receiving an input of an equalized image data signal from the equalizing control unit and outputting it as an output image data signal, wherein the equalizing control means performs a predetermined process outside of an output image region at least at an upper end, a lower end, a right end and left end of the input image data signal.

10. An image processing circuit comprising:

memory control means for receiving an input of an input image data signal;

first storing means for storing the input image data signal after delaying it;

control means for designating at least any one of a main scan coordinate and a subscan coordinate to start equalizing of the input image data signal, a main scan size and a subscan size of the equalized block and skew values in a main scan direction and in a subscan direction of the equalized block;

register setting means for holding the setting information which is designated by the control means;

equalizing control means for performing the equalizing of the input image data signal at a certain timing independently of a skew value of the equalized block on the basis of the setting information held by the register setting unit and outputting the equalized image data signal;

second storing means for receiving an input of the equalized image data signal from the equalizing control means and holding it as an output image data signal; and output control means for outputting the output image data of the second storing means, wherein the equalizing control means performs a predetermined process outside of an output image region at least at an upper end, a lower end, a right end and left end of the input image data signal.

11. An equalizing method comprising:

receiving an input of an input image data signal from a memory control unit;

receiving setting of a main scan coordinate and a subscan coordinate to start at least the equalizing of the input image data signal by a register setting unit;

starting the equalizing of the input image data signal from the main scan coordinate and the subscan coordinate, which are set by the register setting unit, and outputting the equalized image data signal by an equalizing control unit; and receiving an input of the equalized image data signal and outputting it an output image data signal by an output control unit, wherein the equalizing control unit performs a predetermined process outside of an output image region at least at an upper end, a lower end, a right end and a left end of the input image data signal.

12. An equalizing method according to claim 11, wherein, when the register setting unit receives setting with respect to a size of an equalized block as an unit for equalizing the input image data, the equalizing control unit performs the equalizing on the basis of the present equalized block.

13. An equalizing method according to claim 11, wherein the register setting unit receives setting of a skew value of an equalized block as an unit for equalizing the input image data.

14. An equalizing method according to claim 11, wherein the memory control unit delays the input image data signal by lines and controls the delayed input image data signal so that it is output to the equalizing control unit.

15. An equalizing method according to claim 11, the equalizing control unit sets an equalized block as an unit of the equalizing by a certain mode signal.

16. An equalizing method according to claim 11, wherein the equalizing control unit performs a predetermined delay adjustment in such manner that it performs the equalizing at a certain timing independently of a skew value of the equalized block.

17. An image processing method comprising:

receiving an input of an input image data signal by a memory control unit;

storing the input image data signal after delaying it by a first memory;

designating at least any one of a main scan coordinate and a subscan coordinate to start equalizing of the input image data signal, a main scan size and a subscan size of the equalized block and skew values in a main scan direction and in a subscan direction of the equalized block by a CPU;

holding the setting information which is designated by the CPU at register setting unit;

performing the equalizing of the input image data signal at a certain timing independently of a skew value of the equalized block on the basis of the setting information held by the register setting unit and outputting the equalized image data signal by an equalizing control unit;

receiving an input of the equalized image data signal from the equalizing control unit and holding it as an output image data signal by a second memory; and outputting the output image data of the second memory by an output control unit, wherein the equalizing control unit performs a predetermined process outside of an output image region at least at an upper end, a lower end, a right end and a left end of the input image data signal.

* * * * *